United States Patent
Liou

(10) Patent No.: US 11,147,073 B2
(45) Date of Patent: Oct. 12, 2021

(54) METHOD AND APPARATUS FOR BEAM INDICATION FOR PHYSICAL UPLINK SHARED CHANNEL (PUSCH) CONSIDERING MULTIPLE NODES SCENARIO IN A WIRELESS COMMUNICATION SYSTEM

(71) Applicant: ASUSTek Computer Inc., Taipei (TW)

(72) Inventor: Jia-Hong Liou, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 57 days.

(21) Appl. No.: 16/824,395

(22) Filed: Mar. 19, 2020

(65) Prior Publication Data
US 2020/0305168 A1 Sep. 24, 2020

Related U.S. Application Data

(60) Provisional application No. 62/821,837, filed on Mar. 21, 2019.

(51) Int. Cl.
*H04W 72/04* (2009.01)
*H04W 76/11* (2018.01)
*H04L 5/00* (2006.01)

(52) U.S. Cl.
CPC ....... *H04W 72/0493* (2013.01); *H04L 5/0092* (2013.01); *H04W 72/042* (2013.01); *H04W 76/11* (2018.02)

(58) Field of Classification Search
CPC ............. H04W 72/0493; H04W 76/11; H04W 72/042; H04W 72/0406; H04L 5/0092
See application file for complete search history.

(56) References Cited

U.S. PATENT DOCUMENTS

2016/0338044 A1* 11/2016 Yang ................. H04W 72/0426
2019/0141693 A1   5/2019 Guo et al.
(Continued)

*Primary Examiner* — Jael M Ulysse
(74) *Attorney, Agent, or Firm* — Blue Capital Law Firm, P.C.

(57) ABSTRACT

A method and apparatus are disclosed from the perspective of a User Equipment (UE) in a wireless communication system, wherein the UE is configured with and/or is served in a serving cell by a network, wherein an active UL (Uplink) BWP (Bandwidth Part) of the UE is activated in the serving cell. In one embodiment, the method includes the UE receiving an indication and/or a configuration, which is indicative of or associated with a first value of the TRP (Transmission/Reception Point) identifier and a second value of the TRP identifier. The method also includes the UE receiving an indication and/or a configuration, which is indicative of or associated with a first group of PUCCH (Physical Uplink Control Channel) resource(s) of the active UL BWP, wherein the first group of PUCCH resource(s) is associated with or related to the first value of the TRP identifier. The method further includes the UE receiving an indication and/or a configuration, which is indicative of or associated with a second group of PUCCH resource(s) of the active UL BWP, wherein the second group of PUCCH resource(s) is associated with or related to the second value of the TRP identifier. Furthermore, the method includes the UE being scheduled to transmit a PUSCH (Physical Uplink Shared Channel) via a DCI (Downlink Control Information) format 0_0. In addition, the method includes the UE transmitting the PUSCH via a spatial relation of a PUCCH resource, wherein the PUCCH resource is selected or determined based on value of the TRP identifier associated with or related to the PUSCH.

20 Claims, 8 Drawing Sheets

(56) References Cited

U.S. PATENT DOCUMENTS

| | | | |
|---|---|---|---|
| 2019/0141695 A1* | 5/2019 | Babaei | H04L 5/005 |
| 2019/0149365 A1* | 5/2019 | Chatterjee | H04L 5/0094 |
| | | | 370/329 |
| 2019/0215871 A1* | 7/2019 | Aiba | H04W 74/0833 |
| 2019/0254073 A1* | 8/2019 | Sheng | H04W 74/0833 |
| 2019/0379506 A1* | 12/2019 | Cheng | H04W 4/02 |
| 2020/0015229 A1* | 1/2020 | Yang | H04W 72/042 |
| 2020/0092068 A1* | 3/2020 | Yang | H04L 5/0055 |
| 2020/0145169 A1* | 5/2020 | Zhou | H04B 1/713 |
| 2020/0221429 A1* | 7/2020 | Li | H04L 5/0053 |

* cited by examiner

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

FIG. 5 (PRIOR ART)

METHOD AND APPARATUS FOR BEAM INDICATION FOR PHYSICAL UPLINK SHARED CHANNEL (PUSCH) CONSIDERING MULTIPLE NODES SCENARIO IN A WIRELESS COMMUNICATION SYSTEM

CROSS-REFERENCE TO RELATED APPLICATIONS

The present Application claims the benefit of U.S. Provisional Patent Application Ser. No. 62/821,837 filed on Mar. 21, 2019, the entire disclosure of which is incorporated herein in its entirety by reference.

FIELD

This disclosure generally relates to wireless communication networks, and more particularly, to a method and apparatus for beam indication for Physical Uplink Shared Channel (PUSCH) considering in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a User Equipment (UE) in a wireless communication system, wherein the UE is configured with and/or is served in a serving cell by a network, wherein an active UL (Uplink) BWP (Bandwidth Part) of the UE is activated in the serving cell. In one embodiment, the method includes the UE receiving an indication and/or a configuration, which is indicative of or associated with a first value of a TRP (Transmission/Reception Point) identifier and a second value of the TRP identifier. The method also includes the UE receiving an indication and/or a configuration, which is indicative of or associated with a first group of PUCCH (Physical Uplink Control Channel) resource(s) of the active UL BWP, wherein the first group of PUCCH resource(s) is associated with or related to the first value of the TRP identifier. The method further includes the UE receiving an indication and/or a configuration, which is indicative of or associated with a second group of PUCCH resource(s) of the active UL BWP, wherein the second group of PUCCH resource(s) is associated with or related to the second value of the TRP identifier. Furthermore, the method includes the UE being scheduled to transmit a PUSCH (Physical Uplink Shared Channel) via a DCI (Downlink Control Information) format 0_0. In addition, the method includes the UE transmitting the PUSCH via a spatial relation of a PUCCH resource, wherein the PUCCH resource is selected or determined based on value of the TRP identifier associated with or related to the PUSCH.

BRIEF DESCRIPTION OF THE DRAWINGS

FIG. 5 is a reproduction of Table 7.3.1-1 of 3GPP TS 38.212 V15.4.0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TS 38.212 V15.4.0 (2018 December), "NR; Multiplexing and channel coding (Release 15)"; TS 38.213 V15.4.0 (2018 December), "NR; Physical layer procedures for control (Release 15)"; TS 38.214 V15.4.0 (2018 December), "NR; Physical layer procedures for data (Release 15)"; TS 38.331 V15.4.0 (2018 December), "NR; Radio Resource Control (RRC) protocol specification (Release 15)"; Chairman Note of 3GPP TSG RAN WG1 Meeting #95 (Spokane, USA, Nov. 12-16, 2018); Chairman Note of 3GPP TSG RAN WG1 Meeting Ad-Hoc Meeting 1901 Taipei, Taiwan, 21-25 Jan. 2019; and Chairman Note of 3GPP TSG RAN WG1 Meeting #96 Athens, Greece, Feb. 25-Mar. 1, 2019. The standards and documents listed above are hereby expressly incorporated by reference in their entirety.

Figure 1:
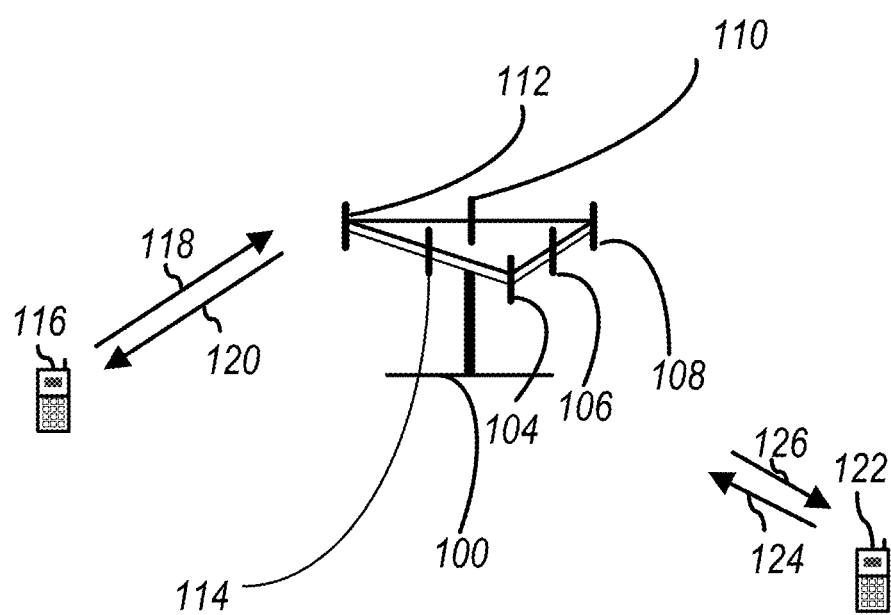
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group.

Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
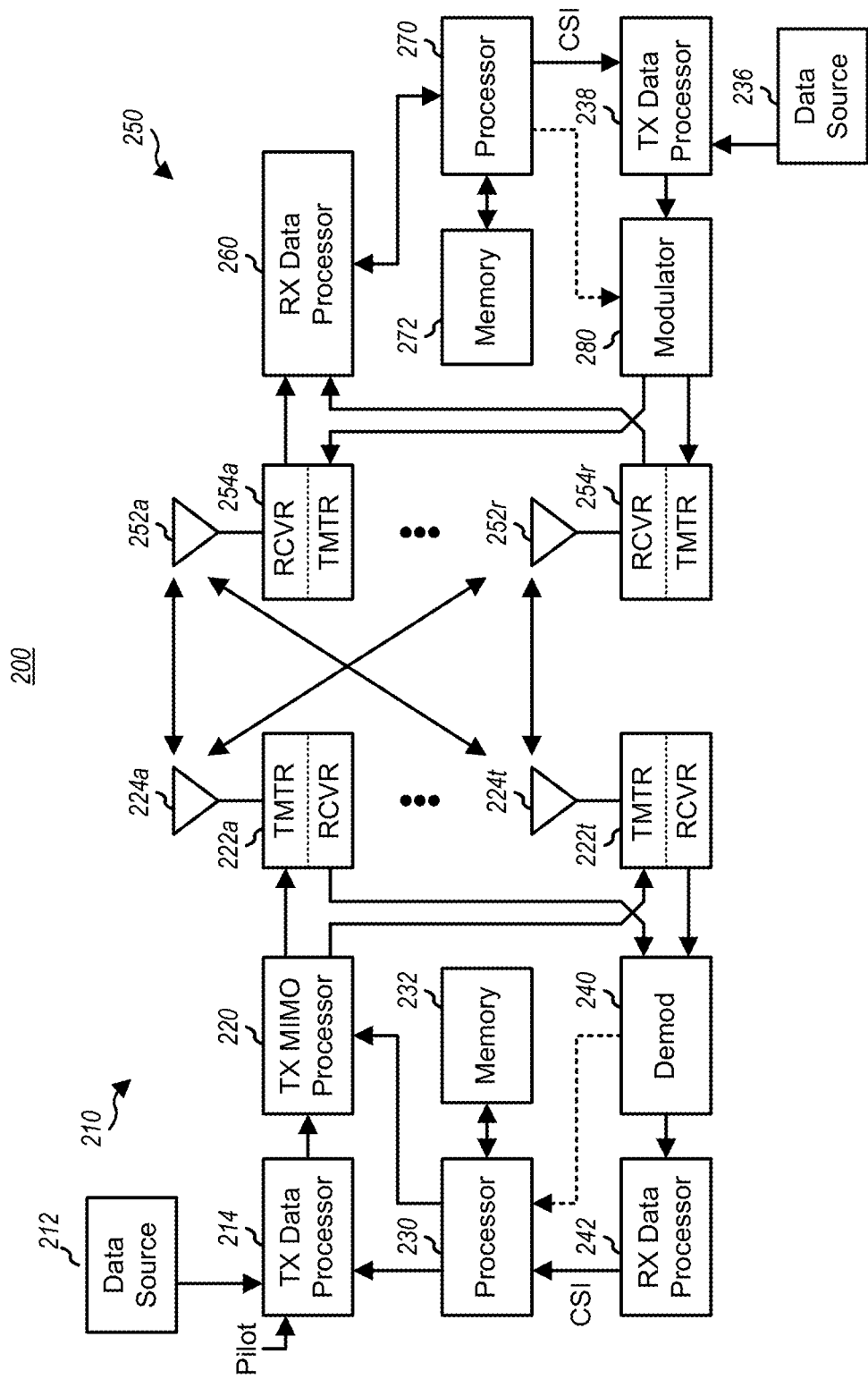
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
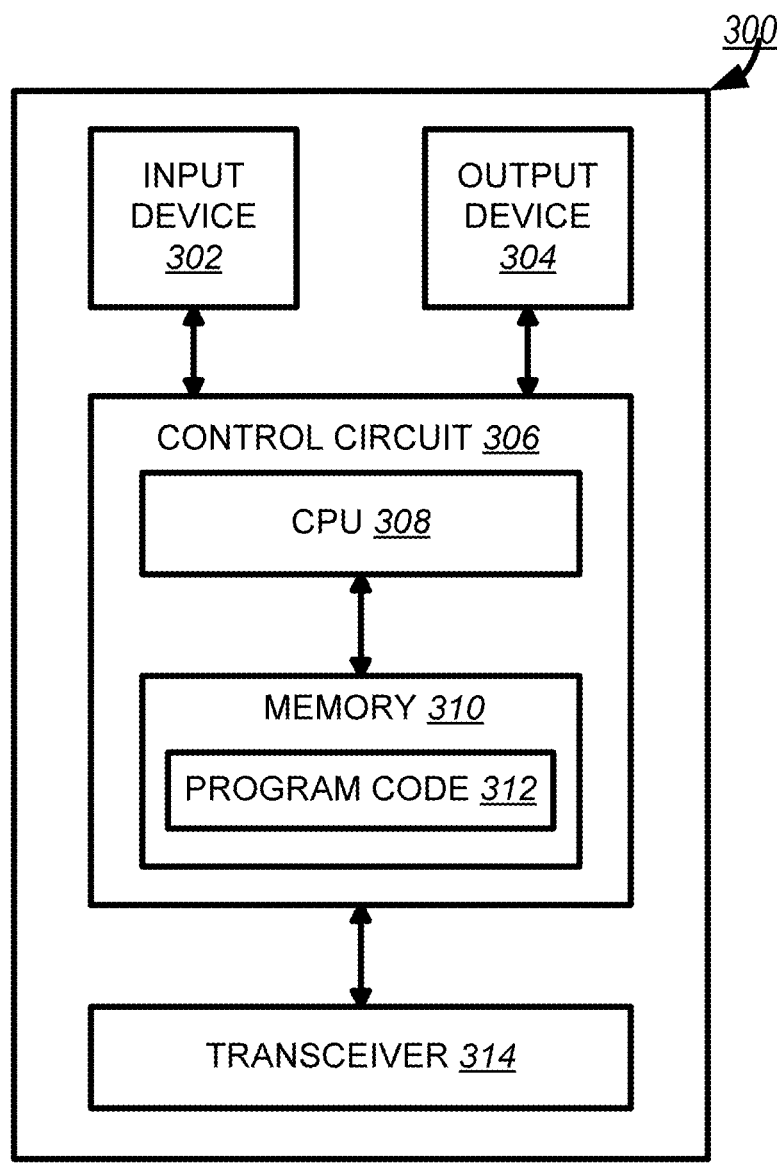
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE or NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
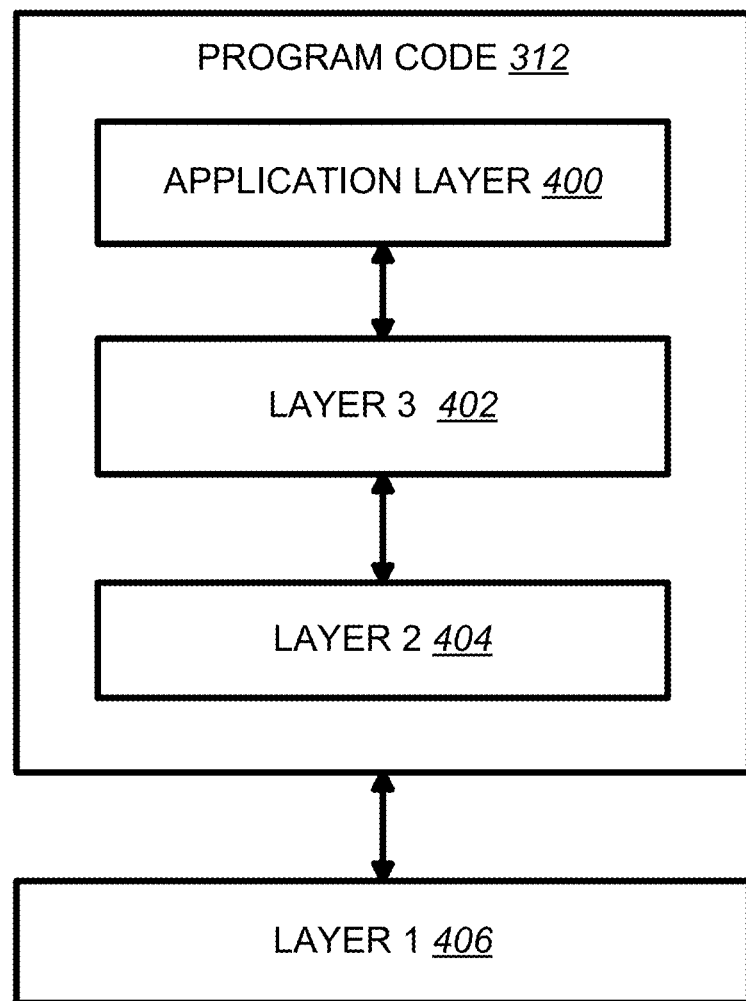
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 38.212 states:

7.3.1 DCI Formats

The DCI formats defined in table 7.3.1-1 are supported.

[Table 7.3.1-1 of 3GPP TS 38.212 V15.4.0, entitled "DCI formats", is reproduced as FIG. 5]

The fields defined in the DCI formats below are mapped to the information bits $a_0$ to $a_{A-1}$ as follows.

Each field is mapped in the order in which it appears in the description, including the zero-padding bit(s), if any, with the first field mapped to the lowest order information bit $a_0$ and each successive field mapped to higher order information bits. The most significant bit of each field is mapped to the lowest order information bit for that field, e.g. the most significant bit of the first field is mapped to $a_0$.

If the number of information bits in a DCI format is less than 12 bits, zeros shall be appended to the DCI format until the payload size equals 12.

The size of each DCI format shall be adjusted as described in clause 7.3.1.0 if necessary.

7.3.1.1 DCI Formats for Scheduling of PUSCH 7.3.1.1.1 Format 0_0

DCI format 0_0 is used for the scheduling of PUSCH in one cell.

The following information is transmitted by means of the DCI format 0_0 with CRC scrambled by C-RNTI or CS-RNTI or MCS-C-RNTI:

Identifier for DCI formats—1 bit
   The value of this bit field is always set to 0, indicating an UL DCI format
Frequency domain resource assignment—$\lceil \log_2 (N_{RB}^{UL,BWP}(N_{RB}^{UL,BWP}+1)/2) \rceil$ bits where $N_{RB}^{UL,BWP}$ is defined in subclause 7.3.1.0
   For PUSCH hopping with resource allocation type 1:
      $N_{UL\_hop}$ MSB bits are used to indicate the frequency offset according to Subclause 6.3 of [6, TS 38.214], where $N_{UL\_hop}=1$ if the higher layer parameter frequencyHoppingOffsetLists contains two offset values and $N_{UL\_hop}=2$ if the higher layer parameter frequencyHoppingOffsetLists contains four offset values
      $\lceil \log_2 (N_{RB}^{UL,BWP}(N_{RB}^{UL,BWP}+1)/2) \rceil - N_{UL\_hop}$ bits provides the frequency domain resource allocation according to Subclause 6.1.2.2.2 of [6, TS 38.214]
   For non-PUSCH hopping with resource allocation type 1:
      $\lceil \log_2(N_{RB}^{UL,BWP}(N_{RB}^{UL,BWP}+1)/2) \rceil$ bits provides the frequency domain resource allocation according to Subclause 6.1.2.2.2 of [6, TS 38.214]
Time domain resource assignment—4 bits as defined in Subclause 6.1.2.1 of [6, TS 38.214]
Frequency hopping flag—1 bit according to Table 7.3.1.1.1-3, as defined in Subclause 6.3 of [6, TS 38.214]
Modulation and coding scheme—5 bits as defined in Subclause 6.1.4.1 of [6, TS 38.214]
New data indicator—1 bit
Redundancy version—2 bits as defined in Table 7.3.1.1.1-2
HARQ process number—4 bits
TPC command for scheduled PUSCH—2 bits as defined in Subclause 7.1.1 of [5, TS 38.213]
Padding bits, if required.
UL/SUL indicator—1 bit for UEs configured with SUL in the cell as defined in Table 7.3.1.1.1-1 and the number of bits for DCI format 1_0 before padding is larger than the number of bits for DCI format 0_0 before padding; 0 bit otherwise. The UL/SUL indicator, if present, locates in the last bit position of DCI format 0_0, after the padding bit(s).
   If the UL/SUL indicator is present in DCI format 0_0 and the higher layer parameter pusch-Config is not configured on both UL and SUL the UE ignores the UL/SUL indicator field in DCI format 0_0, and the corresponding PUSCH scheduled by the DCI format 0_0 is for the UL or SUL for which high layer parameter pucch-Config is configured;
   If the UL/SUL indicator is not present in DCI format 0_0, the corresponding PUSCH scheduled by the DCI format 0_0 is for the UL or SUL for which high layer parameter pucch-Config is configured.

The following information is transmitted by means of the DCI format 0_0 with CRC scrambled by TC-RNTI:

Identifier for DCI formats—1 bit
   The value of this bit field is always set to 0, indicating an UL DCI format
Frequency domain resource assignment—$\lceil \log_2 (N_{RB}^{UL,BWP}(N_{RB}^{UL,BWP}+1)/2) \rceil$ bits where $N_{RB}^{UL,BWP}$ is the size of the initial UL bandwidth part.
   For PUSCH hopping with resource allocation type 1:
      $N_{UL\_hop}$ MSB bits are used to indicate the frequency offset according to Subclause 6.3 of [6, TS 38.214], where $N_{UL\_hop}=1$ if $N_{RB}^{UL,BWP}<50$ and $N_{UL\_hop}=2$ otherwise
      $\lceil \log_2 (N_{RB}^{UL,BWP}(N_{RB}^{UL,BWP}+1)/2) \rceil - N_{UL\_hop}$ bits provides the frequency domain resource allocation according to Subclause 6.1.2.2.2 of [6, TS 38.214]
   For non-PUSCH hopping with resource allocation type 1:
      $\lceil \log_2(N_{RB}^{UL,BWP}(N_{RB}^{UL,BWP}+1)/2) \rceil$ bits provides the frequency domain resource allocation according to Subclause 6.1.2.2.2 of [6, TS 38.214]
Time domain resource assignment—4 bits as defined in Subclause 6.1.2.1 of [6, TS 38.214]
Frequency hopping flag—1 bit according to Table 7.3.1.1.1-3, as defined in Subclause 6.3 of [6, TS 38.214]
Modulation and coding scheme—5 bits as defined in Subclause 6.1.4.1 of [6, TS 38.214]
New data indicator—1 bit, reserved
Redundancy version—2 bits as defined in Table 7.3.1.1.1-2
HARQ process number—4 bits, reserved
TPC command for scheduled PUSCH—2 bits as defined in Subclause 7.1.1 of [5, TS 38.213]
Padding bits, if required.
UL/SUL indicator—1 bit if the cell has two ULs and the number of bits for DCI format 1_0 before padding is larger than the number of bits for DCI format 0_0 before padding; 0 bit otherwise. The UL/SUL indicator, if present, locates in the last bit position of DCI format 0_0, after the padding bit(s).

If 1 bit, reserved, and the corresponding PUSCH is always on the same UL carrier as the previous transmission of the same TB 7.3.1.1.2 Format 0_1

DCI format 0_1 is used for the scheduling of PUSCH in one cell.

The following information is transmitted by means of the DCI format 0_1 with CRC scrambled by C-RNTI or CS-RNTI or SP-CSI-RNTI or MCS-C-RNTI:

Identifier for DCI formats—1 bit
  The value of this bit field is always set to 0, indicating an UL DCI format
Carrier indicator—0 or 3 bits, as defined in Subclause 10.1 of [5, TS38.213].
UL/SUL indicator—0 bit for UEs not configured with SUL in the cell or UEs configured with SUL in the cell but only PUCCH carrier in the cell is configured for PUSCH transmission; 1 bit for UEs configured with SUL in the cell as defined in Table 7.3.1.1.1-1.
Bandwidth part indicator—0, 1 or 2 bits as determined by the number of UL BWPs $n_{BWP\_RRC}$ configured by higher layers, excluding the initial UL bandwidth part. The bitwidth for this field is determined as $\lceil \log_2 (n_{BWP}) \rceil$ bits, where
  $n_{BWP}=n_{BWP,RRC}+1$ if $n_{BWP,RRC} \leq 3$, in which case the bandwidth part indicator is equivalent to the ascending order of the higher layer parameter BWP-Id;
  otherwise $n_{BWP}=n_{BWP,RRC}$, in which case the bandwidth part indicator is defined in Table 7.3.1.1.2-1;
If a UE does not support active BWP change via DCI, the UE ignores this bit field.
Frequency domain resource assignment—number of bits determined by the following, where $N_{RB}^{UL,BWP}$ is the size of the active UL bandwidth part:
  [ . . . ]
Time domain resource assignment—0, 1, 2, 3, or 4 bits as defined in Subclause 6.1.2.1 of [6, TS38.214]. The bitwidth for this field is determined as $\lceil \log_2(I) \rceil$ bits, where I is the number of entries in the higher layer parameter pusch-TimeDomainAllocationList if the higher layer parameter is configured; otherwise I is the number of entries in the default table.
Frequency hopping flag—0 or 1 bit:
  0 bit if only resource allocation type 0 is configured or if the higher layer parameter frequencyHopping is not configured;
  1 bit according to Table 7.3.1.1.1-3 otherwise, only applicable to resource allocation type 1, as defined in Subclause 6.3 of [6, TS 38.214].
Modulation and coding scheme—5 bits as defined in Subclause 6.1.4.1 of [6, TS 38.214]
New data indicator—1 bit
Redundancy version—2 bits as defined in Table 7.3.1.1.1-2
HARQ process number—4 bits
1$^{st}$ downlink assignment index—1 or 2 bits:
  1 bit for semi-static HARQ-ACK codebook;
  2 bits for dynamic HARQ-ACK codebook.
2$^{nd}$ downlink assignment index—0 or 2 bits:
  2 bits for dynamic HARQ-ACK codebook with two HARQ-ACK sub-codebooks;
  0 bit otherwise.
TPC command for scheduled PUSCH—2 bits as defined in Subclause 7.1.1 of [5, TS38.213]
SRS resource indicator $$-\left\lceil \log_2 \left( \sum_{k=1}^{\min\{L_{max},N_{SRS}\}} \binom{N_{SRS}}{k} \right) \right\rceil \text{ or } \lceil \log_2(N_{SRS}) \rceil$$

bits, where $N_{SRS}$ is the number of configured SRS resources in the SRS resource set associated with the higher layer parameter usage of value 'codeBook' or 'nonCodeBook', and $L_{max}^{PUSCH}$ is the maximum number of supported layers for the PUSCH.

$$\left\lceil \log_2 \left( \sum_{k=1}^{\min\{L_{max}^{PUSCH},N_{SRS}\}} \binom{N_{SRS}}{k} \right) \right\rceil$$

bits according to Tables 7.3.1.1.2-28/29/30/31 if the higher layer parameter txConfig=nonCodebook, where $N_{SRS}$ is the number of configured SRS resources in the SRS resource set associated with the higher layer parameter usage of value 'nonCodeBook';
$\lceil \log_2(N_{SRS}) \rceil$ bits according to Tables 7.3.1.1.2-32 if the higher layer parameter txConfig=codebook, where $N_{SRS}$ is the number of configured SRS resources in the SRS resource set associated with the higher layer parameter usage of value 'codeBook'
Precoding information and number of layers—number of bits determined by the following:
[ . . . ]
Antenna ports—number of bits determined by the following
[ . . . ]
SRS request—2 bits as defined by Table 7.3.1.1.2-24 for UEs not configured with SUL in the cell; 3 bits for UEs configured SUL in the cell where the first bit is the non-SUL/SUL indicator as defined in Table 7.3.1.1.1-1 and the second and third bits are defined by Table 7.3.1.1.2-24. This bit field may also indicate the associated CSI-RS according to Subclause 6.1.1.2 of [6, TS 38.214].
CSI request—0, 1, 2, 3, 4, 5, or 6 bits determined by higher layer parameter reportTriggerSize.
CBG transmission information (CBGTI)—0, 2, 4, 6, or 8 bits determined by higher layer parameter maxCodeBlockGroupsPerTransportBlock for PUSCH.
PTRS-DMRS association—number of bits determined as follows
[ . . . ]
beta_offset indicator—0 if the higher layer parameter betaOffsets=semiStatic; otherwise 2 bits as defined by Table 9.3-3 in [5, TS 38.213].
DMRS sequence initialization—0 bit if transform precoder is enabled; 1 bit if transform precoder is disabled.
UL-SCH indicator—1 bit. A value of "1" indicates UL-SCH shall be transmitted on the PUSCH and a value of "0" indicates UL-SCH shall not be transmitted on the PUSCH. A UE is not expected to receive a DCI format 0_1 with UL-SCH indicator of "0" and CSI request of all zero(s).

3GPP TS 38.213 states:
If a UE has dedicated PUCCH resource configuration, the UE is provided by higher layers with one or more PUCCH resources.
A PUCCH resource includes the following parameters:
- a PUCCH resource index provided by pucch-ResourceId
- an index of the first PRB prior to frequency hopping or for no frequency hopping by startingPRB
- an index of the first PRB after frequency hopping by secondHopPRB;
- an indication for intra-slot frequency hopping by intraSlotFrequencyHopping
- a configuration for a PUCCH format, from PUCCH format 0 through PUCCH format 4, provided by format

[ . . . ]

9.2.2 PUCCH Formats for UCI Transmission

[ . . . ]

A spatial setting for a PUCCH transmission is provided by PUCCH-SpatialRelationInfo if the UE is configured with a single value for pucch-SpatialRelationInfoId; otherwise, if the UE is provided multiple values for PUCCH-SpatialRelationInfo, the UE determines a spatial setting for the PUCCH transmission as described in [11, TS 38.321]. The UE applies corresponding actions in [11, TS 38.321] and a corresponding setting for a spatial domain filter to transmit PUCCH 3 msec after the slot where the UE transmits HARQ-ACK information with ACK value corresponding to a PDSCH reception providing the PUCCH-SpatialRelationInfo

- If PUCCH-SpatialRelationInfo provides ssb-Index, the UE transmits the PUCCH using a same spatial domain filter as for a reception of a SS/PBCH block with index provided by ssb-Index for a same serving cell or, if servingCellId is provided, for a serving cell indicated by servingCellId
- else if PUCCH-SpatialRelationInfo provides csi-RS-Index, the UE transmits the PUCCH using a same spatial domain filter as for a reception of a CSI-RS with resource index provided by csi-RS-Index for a same serving cell or, if servingCellId is provided, for a serving cell indicated by servingCellId
- else PUCCH-SpatialRelationInfo provides srs, the UE transmits the PUCCH using a same spatial domain filter as for a transmission of a SRS with resource index provided by resource for a same serving cell and/or active UL BWP or, if servingCellId and/or uplinkBWP are provided, for a serving cell indicated by servingCellId and/or for an UL BWP indicated by uplinkBWP 10 Bandwidth Part Operation

[ . . . ]

A UE configured for operation in bandwidth parts (BWPs) of a serving cell, is configured by higher layers for the serving cell a set of at most four bandwidth parts (BWPs) for receptions by the UE (DL BWP set) in a DL bandwidth by parameter BWP-Downlink and a set of at most four BWPs for transmissions by the UE (UL BWP set) in an UL bandwidth by parameter BWP-Uplink.

[ . . . ]

For each DL BWP or UL BWP in a set of DL BWPs or UL BWPs, respectively, the UE is provided the following parameters for the serving cell as defined in [4, TS 38.211] or [6, TS 38.214]:
- a SCS by subcarrierSpacing
- a cyclic prefix by cyclicPrefix
- a common RB $N_{BWP}^{start}=O_{carrier}+RB_{start}$ and a number of contiguous RBs $N_{BWP}^{size}=L_{RB}$ provided by locationAndBandwidth that indicates an offset $RB_{start}$ and a length $L_{RB}$ as RIV according to [6, TS 38.214], setting $N_{BWP}^{size}=275$, and a value $O_{carrier}$ provided by offsetToCarrier for the subcarrierSpacing
- an index in the set of DL BWPs or UL BWPs by respective bwp-Id
- a set of BWP-common and a set of BWP-dedicated parameters by bwp-Common and bwp-Dedicated [12, TS 38.331]

For unpaired spectrum operation, a DL BWP from the set of configured DL BWPs with index provided by bwp-Id is linked with an UL BWP from the set of configured UL BWPs with index provided by bwp-Id when the DL BWP index and the UL BWP index are same. For unpaired spectrum operation, a UE does not expect to receive a configuration where the center frequency for a DL BWP is different than the center frequency for an UL BWP when the bwp-Id of the DL BWP is same as the bwp-Id of the UL BWP.

For each DL BWP in a set of DL BWPs of the PCell, or of the PUCCH-SCell, a UE can be configured CORESETs for every type of CSS sets and for USS as described in Subclause 10.1. The UE does not expect to be configured without a CSS set on the PCell, or on the PUCCH-SCell, of the MCG in the active DL BWP.

[ . . . ]

For each UL BWP in a set of UL BWPs of the PCell or of the PUCCH-SCell, the UE is configured resource sets for PUCCH transmissions as described in Subclause 9.2.1.

A UE receives PDCCH and PDSCH in a DL BWP according to a configured SCS and CP length for the DL BWP. A UE transmits PUCCH and PUSCH in an UL BWP according to a configured SCS and CP length for the UL BWP.

[ . . . ]

For a serving cell, a UE can be provided by defaultDownlinkBWP-Id a default DL BWP among the configured DL BWPs. If a UE is not provided a default DL BWP by defaultDownlinkBWP-Id, the default DL BWP is the initial active DL BWP.

[ . . . ]

3GPP TS 38.214 states:

6.1 UE Procedure for Transmitting the Physical Uplink Shared Channel

PUSCH transmission(s) can be dynamically scheduled by an UL grant in a DCI, or the transmission can correspond to a configured grant Type 1 or Type 2. The configured grant Type 1 PUSCH transmission is semi-statically configured to operate upon the reception of higher layer parameter of configuredGrantConfig including rrc-ConfiguredUplinkGrant without the detection of an UL grant in a DCI. The configured grant Type 2 PUSCH transmission is semi-persistently scheduled by an UL grant in a valid activation DCI according to Subclause 10.2 of [6, TS 38.213] after the reception of higher layer parameter configurdGrantConfig not including rrc-ConfiguredUplinkGrant.

For the PUSCH transmission corresponding to a configured grant, the parameters applied for the transmission are provided by configuredGrantConfig expect for dataScramblingIdentityPUSCH, txConfig, codebookSubset, maxRank, scaling of UCI-OnPUSCH, which are provided by pusch-Config. If the UE is provided with transformPrecoder in configuredGrantConfig, the UE applies the higher layer parameter tp-pi2BPSK, if provided in pusch-Config, according to the procedure described in Subclause 6.1.4 for the PUSCH transmission corresponding to a configured grant.

For the PUSCH retransmission scheduled by a PDCCH with CRC scrambled by CS-RNTI with NDI=1, the parameters in pusch-Config are applied for the PUSCH transmission except for p0-NominalWithoutGrant, p0-PUSCH-Alpha, powerControlLoopToUse, path lossReferenceIndex described in Subclause 7.1 of [6, TS 38.213], mcs-Table, mcs-TableTransformPrecoder described in Subclause 6.1.4.1 and transformPrecoder described in Subclause 6.1.3. [ . . . ]
For PUSCH scheduled by DCI format 0_0 on a cell, the UE shall transmit PUSCH according to the spatial relation, if applicable, corresponding to the PUCCH resource with the lowest ID within the active UL BWP of the cell, as described in sub-clause 9.2.1 of [6, TS 38.213].

6.1.1 Transmission Schemes

Two transmission schemes are supported for PUSCH: codebook based transmission and non-codebook based transmission. The UE is configured with codebook based transmission when the higher layer parameter txConfig in puschConfig is set to 'codebook', the UE is configured non-codebook based transmission when the higher layer parameter txConfig is set to 'nonCodebook'. If the higher layer parameter txConfig is not configured, the UE is not expected to be scheduled by DCI format 0_1. If PUSCH is scheduled by DCI format 0_0, the PUSCH transmission is based on a single antenna port. The UE shall not expect PUSCH scheduled by DCI format 0_0 in a BWP without configured PUCCH resource with PUCCH-SpatialRelationInfo in frequency range 2 in RRC connected mode.

3GPP TS 38.331 states:

BWP-Downlink

The IE BWP-Downlink is used to configure an additional downlink bandwidth part (not for the initial BWP). The field bwp-Id in this IE does not take the value 0 since that is reserved for the initial BWP.

| BWP-Downlink information element |
|---|
| -- ASN1START<br>-- TAG-BWP-DOWNLINK-START<br>BWP-Downlink ::=                    SEQUENCE {<br>  bwp-Id                           BWP-Id,<br>  bwp-Common                       BWP-DownlinkCommon<br>OPTIONAL, -- Cond SetupOtherBWP<br>  bwp-Dedicated                    BWP-DownlinkDedicated<br>OPTIONAL, -- Need M<br>  ...<br>}<br>-- TAG-BWP-DOWNLINK-STOP<br>-- ASN1STOP |

| BWP-Downlink field descriptions |
|---|
| bwp-Id |
| An identifier for this bandwidth part. Other parts of the RRC configuration use the BWP-Id to associate themselves with a particular bandwidth part. The network configures the BWPs with consecutive IDs. |

BWP-DownlinkCommon

The IE BWP-DownlinkCommon is used to configure the common parameters of a downlink BWP. They are "cell specific" and the network ensures the necessary alignment with corresponding parameters of other UEs. The common parameters of the initial bandwidth part of the PCell are also provided via system information. For all other serving cells, the network provides the common parameters via dedicated signalling.

| BWP-DownlinkCommon information element |
|---|
| -- ASN1START<br>-- TAG-BWP-DOWNLINKCOMMON-START<br>BWP-DownlinkCommon ::=              SEQUENCE {<br>  genericParameters                  BWP,<br>  pdcch-ConfigCommon                 SetupRelease { PDCCH-ConfigCommon }<br>OPTIONAL, -- Need M<br>  pdsch-ConfigCommon                 SetupRelease { PDSCH-ConfigCommon }<br>OPTIONAL, -- Need M<br>  ...<br>}<br>-- TAG-BWP-DOWNLINKCOMMON-STOP<br>-- ASN1STOP |

BWP-DownlinkDedicated

The IE BWP-DownlinkDedicated is used to configure the dedicated (UE specific) parameters of a downlink BWP.

| BWP-DownlinkDedicated information element |
|---|
| -- ASN1START<br>-- TAG-BWP-DOWNLINKDEDICATED-START<br>BWP-DownlinkDedicated ::=            SEQUENCE {<br>  pdcch-Config                         SetupRelease { PDCCH-Config } |

| BWP-DownlinkDedicated information element |
| --- |
| OPTIONAL, -- Need M<br>  pdsch-Config                                     SetupRelease { PDSCH-Config }<br>OPTIONAL, -- Need M<br>  sps-Config                                         SetupRelease { SPS-Config }<br>OPTIONAL, -- Need M<br>  radioLinkMonitoringConfig          SetupRelease { RadioLinkMonitoringConfig }<br>OPTIONAL, -- Need M<br>  ...<br>}<br>-- TAG-BWP-DOWNLINKDEDICATED-STOP<br>-- ASN1STOP |

BWP-Uplink

The IE BWP-Uplink is used to configure an additional uplink bandwidth part (not for the initial BWP). The field bwp-Id in this IE does not take the value 0 since that is reserved for the initial BWP.

| BWP-Uplink information element |
| --- |
| -- ASN1START<br>-- TAG-BWP-UPLINK-START<br>BWP-Uplink ::=                 SEQUENCE {<br>  bwp-Id                          BWP-Id,<br>  bwp-Common                   BWP-UplinkCommon |

| BWP-Uplink information element |
| --- |
| OPTIONAL, -- Cond SetupOtherBWP<br>  bwp-Dedicated                BWP-UplinkDedicated<br>OPTIONAL, -- Need M<br>  ...<br>}<br>-- TAG-BWP-UPLINK-STOP<br>-- ASN1STOP |

| BWP-Uplink field descriptions |
| --- |
| bwp-Id |
| An identifier for this bandwidth part. Other parts of the RRC configuration use the BWP-Id to associate themselves with a particular bandwidth part.<br>The network configures the BWPs with consecutive IDs. |

BWP-UplinkCommon

The IE BWP-UplinkCommon is used to configure the common parameters of an uplink BWP. They are "cell specific" and the network ensures the necessary alignment with corresponding parameters of other UEs. The common parameters of the initial bandwidth part of the PCell are also provided via system information. For all other serving cells, the network provides the common parameters via dedicated signalling.

| BWP-UplinkCommon information element |
| --- |
| -- ASN1START<br>-- TAG-BWP-UPLINKCOMMON-START<br>BWP-UplinkCommon ::=          SEQUENCE {<br>  genericParameters             BWP,<br>  rach-ConfigCommon             SetupRelease { RACH-ConfigCommon }<br>OPTIONAL, -- Need M<br>  pusch-ConfigCommon            SetupRelease { PUSCH-ConfigCommon }<br>OPTIONAL, -- Need M<br>  pucch-ConfigCommon            SetupRelease { PUCCH-ConfigCommon }<br>OPTIONAL, -- Need M<br>  ...<br>}<br>-- TAG-BWP-UPLINKCOMMON-STOP<br>-- ASN1STOP |

BWP-UplinkDedicated
The IE BWP-UplinkDedicated is used to configure the dedicated (UE specific) parameters of a uplink BWP.

| BWP-UplinkDedicated information element |
| --- |
| -- ASN1START<br>-- TAG-BWP-UPLINKDEDICATED-START<br>BWP-UplinkDedicated ::=     SEQUENCE {<br>  pucch-Config                SetupRelease { PUCCH-Config }<br>OPTIONAL, -- Need M<br>  pusch-Config                SetupRelease { PUSCH-Config }<br>OPTIONAL, -- Need M<br>  configuredGrantConfig       SetupRelease { ConfiguredGrantConfig }<br>OPTIONAL, -- Need M<br>  srs-Config                  SetupRelease { SRS-Config }<br>OPTIONAL, -- Need M<br>  beamFailureRecoveryConfig   SetupRelease { BeamFailureRecoveryConfig }<br>OPTIONAL, -- Cond SpCellOnly<br>  ...<br>}<br>-- TAG-BWP-UPLINKDEDICATED-STOP<br>-- ASN1STOP |

ControlResourceSet
The IE ControlResourceSet is used to configure a time/frequency control resource set (CORESET) in which to search for downlink control information (see TS 38.213 [13], clause FFS_Section).

| ControlResourceSet information element |
| --- |
| -- ASN1START<br>-- TAG-CONTROLRESOURCESET-START<br>ControlResourceSet ::=                  SEQUENCE {<br>  controlResourceSetId                  ControlResourceSetId,<br>  frequencyDomainResources              BIT STRING (SIZE (45)),<br>  duration                              INTEGER (1..maxCoReSetDuration),<br>  cce-REG-MappingType                   CHOICE {<br>    interleaved                         SEQUENCE {<br>      reg-BundleSize                    ENUMERATED {n2, n3, n6},<br>      interleaverSize                   ENUMERATED {n2, n3, n6},<br>      shiftIndex                        INTEGER(0..maxNrofPhysicalResourceBlocks-1)<br>OPTIONAL -- Need S<br>    },<br>    nonInterleaved                      NULL<br>  },<br>  precoderGranularity                   ENUMERATED {sameAsREG-bundle, allContiguousRBs},<br>  tci-StatesPDCCH-ToAddList             SEQUENCE(SIZE (1..maxNrofTCI-StatesPDCCH)) OF TCI-StateId<br>OPTIONAL,-- Cond NotSIB1-initialBWP<br>  tci-StatesPDCCH-ToReleaseList         SEQUENCE (SIZE (1..maxNrofTCI-StatesPDCCH)) OF TCI-StateId<br>OPTIONAL, -- Cond NotSIB1-initialBWP<br>  tci-PresentInDCI                      ENUMERATED {enabled}<br>OPTIONAL, -- Need S<br>  pdcch-DMRS-ScramblingID               INTEGER (0..65535)<br>OPTIONAL, -- Need S<br>  ...<br>}<br>-- TAG-CONTROLRESOURCESET-STOP<br>-- ASN1STOP |

| ControlResourceSet field descriptions |
| --- |
| tci-PresentInDCI |
| If at least spatial QCL is configured/indicated, this field indicates if TCI field is present or not present in DL-related DCI. When the field is absent the UE considers the TCI to be absent/disabled (see TS 38.214 [19], clause 5.1.5). |

-continued

| ControlResourceSet field descriptions |
|---|
| tci-StatesPDCCH-ToAddList |
| A subset of the TCI states defined in pdsch-Config. They are used for providing QCL relationships between the DL RS(s) in one RS Set (TCI-State) and the PDCCH DMRS ports (see TS 38.213 [13], clause 6.). The network configures at most maxNrofTCI-StatesPDCCH entries. |

ControlResourceSetId

The ControlResourceSetId IE concerns a short identity, used to identify a control resource set within a serving cell. The ControlResourceSetId=0 identifies the ControlResourceSet #0 configured via PBCH (MIB) and in controlResourceSetZero (ServingCellConfigCommon). The ID space is used across the BWPs of a Serving Cell. The number of CORESETs per BWP is limited to 3 (including common and UE-specific CORESETs).

| ControlResourceSetId information element |
|---|
| -- ASN1START<br>-- TAG-CONTROL-RESOURCE-SET-ID-START<br>ControlResourceSetId ::=                    INTEGER (0..maxNrofControlResourceSets-1)<br>-- TAG-CONTROL-RESOURCE-SET-ID-STOP<br>-- ASN1STOP |

PUCCH-Config

The IE PUCCH-Config is used to configure UE specific PUCCH parameters (per BWP).

| PUCCH-Config information element |
|---|
| ```
-- ASN1START
-- TAG-PUCCH-CONFIG-START
PUCCH-Config ::=                                        SEQUENCE {
  resourceSetToAddModList                                 SEQUENCE (SIZE (1..maxNrofPUCCH-ResourceSets)) OF
PUCCH-ResourceSet                    OPTIONAL, -- Need N
  resourceSetToReleaseList                                SEQUENCE (SIZE (1..maxNrofPUCCH-ResourceSets)) OF
PUCCH-ResourceSetId                  OPTIONAL, -- Need N
  resourceToAddModList                                    SEQUENCE (SIZE (1..maxNrofPUCCH-Resources)) OF PUCCH-
Resource                             OPTIONAL, -- Need N
  resourceToReleaseList                                   SEQUENCE (SIZE (1..maxNrofPUCCH-Resources)) OF PUCCH-
ResourceId                           OPTIONAL, -- Need N
  format1                                                 SetupRelease { PUCCH-FormatConfig }
OPTIONAL, -- Need M
  format2                                                 SetupRelease { PUCCH-FormatConfig }
OPTIONAL, -- Need M
  format3                                                 SetupRelease { PUCCH-FormatConfig }
OPTIONAL, -- Need M
  format4                                                 SetupRelease { PUCCH-FormatConfig }
OPTIONAL, -- Need M
  schedulingRequestResourceToAddModList                   SEQUENCE (SIZE (1..maxNrofSR-Resources)) OF
SchedulingRequestResourceConfig      OPTIONAL, -- Need N
  schedulingRequestResourceToReleaseList                  SEQUENCE (SIZE (1..maxNrofSR-Resources)) OF
SchedulingRequestResourceId          OPTIONAL, -- Need N
  multi-CSI-PUCCH-ResourceList                            SEQUENCE (SIZE (1..2)) OF PUCCH-ResourceId
OPTIONAL, -- Need M
  dl-DataToUL-ACK                                         SEQUENCE (SIZE (1..8)) OF INTEGER (0..15)
OPTIONAL, -- Need M
  spatialRelationInfoToAddModList                         SEQUENCE (SIZE (1..maxNrofSpatialRelationInfos)) OF
PUCCH-SpatialRelationInfo            OPTIONAL, -- Need N
  spatialRelationInfoToReleaseList                        SEQUENCE (SIZE (1..maxNrofSpatialRelationInfos)) OF
PUCCH-SpatialRelationInfoId
OPTIONAL, -- Need N
  pucch-PowerControl                                      PUCCH-PowerControl
OPTIONAL, -- Need M
  ...
}
PUCCH-FormatConfig ::=                                  SEQUENCE {
  interslotFrequencyHopping                               ENUMERATED {enabled}
OPTIONAL, -- Need R
  additionalDMRS                                          ENUMERATED {true}
OPTIONAL, -- Need R
  maxCodeRate                                             PUCCH-MaxCodeRate
OPTIONAL, -- Need R
  nrofSlots                                               ENUMERATED {n2,n4,n8}
``` |

| PUCCH-Config information element | |
|---|---|
| OPTIONAL, -- Need S | |
|   pi2BPSK | ENUMERATED {enabled} |
| OPTIONAL, -- Need R | |
|   simultaneousHARQ-ACK-CSI | ENUMERATED {true} |
| OPTIONAL -- Need R | |
| } | |
| PUCCH-MaxCodeRate ::= | ENUMERATED {zeroDot08, zeroDot15, zeroDot25, zeroDot35, |
| zeroDot45, zeroDot60, zeroDot80} | |
| -- A set with one or more PUCCH resources | |
| PUCCH-ResourceSet ::= | SEQUENCE { |
|   pucch-ResourceSetId | PUCCH-ResourceSetId, |
|   resourceList | SEQUENCE (SIZE (1..maxNrofPUCCH-ResourcesPerSet)) OF PUCCH- |
| ResourceId, | |
|   maxPayloadMinusl | INTEGER (4..256) |
| OPTIONAL -- Need R | |
| } | |
| PUCCH-ResourceSetId ::= | INTEGER (0..maxNrofPUCCH-ResourceSets-1) |
| PUCCH-Resource ::= | SEQUENCE { |
|   pucch-ResourceId | PUCCH-ResourceId, |
|   startingPRB | PRB-Id, |
|   intraSlotFrequencyHopping | ENUMERATED { enabled } |
| OPTIONAL, -- Need R | |
|   secondHopPRB | PRB-Id |
| OPTIONAL, -- Need R | |
|   format | CHOICE { |
|     format0 | PUCCH-format0, |
|     format1 | PUCCH-format1, |
|     format2 | PUCCH-format2, |
|     format3 | PUCCH-format3, |
|     format4 | PUCCH-format4 |
|   } | |
| } | |
| PUCCH-ResourceId ::= | INTEGER (0..maxNrofPUCCH-Resources-1) |
| PUCCH-format0 ::= | SEQUENCE { |
|   initialCyclicShift | INTEGER(0..11), |
|   nrofSymbols | INTEGER (1..2), |
|   startingSymbolIndex | INTEGER(0..13) |
| } | |
| PUCCH-format1 ::= | SEQUENCE { |
|   initialCyclicShift | INTEGER(0..11), |
|   nrofSymbols | INTEGER (4..14), |
|   startingSymbolIndex | INTEGER(0..10), |
|   timeDomainOCC | INTEGER(0..6) |
| } | |
| PUCCH-format2 ::= | SEQUENCE { |
|   nrofPRBs | INTEGER (1..16), |
|   nrofSymbols | INTEGER (1..2), |
|   startingSymbolIndex | INTEGER(0..13) |
| } | |
| PUCCH-format3 ::= | SEQUENCE { |
|   nrofPRBs | INTEGER (1..16), |
|   nrofSymbols | INTEGER (4..14), |
|   startingSymbolIndex | INTEGER(0..10) |
| } | |
| PUCCH-format4 ::= | SEQUENCE { |
|   nrofSymbols | INTEGER (4..14), |
|   occ-Length | ENUMERATED {n2,n4}, |
|   occ-Index | ENUMERATED {n0,n1,n2,n3}, |
|   startingSymbolIndex | INTEGER(0..10) |
| } | |
| -- TAG-PUCCH-CONFIG-STOP | |
| -- ASN1STOP | |

| PUCCH-Config field descriptions |
| --- |
| resourceSetToAddModList |
| Lists for adding and releasing PUCCH resource sets (see TS 38.213 [13], clause 9.2).<br>resourceToAddModList, resourceToReleaseList |
| Lists for adding and releasing PUCCH resources applicable for the UL BWP and serving cell in which the PUCCH-Config is defined. The resources defined herein are referred to from other parts of the configuration to determine which resource the UE shall use for which report.<br>spatialRelationInfoToAddModList |
| Configuration of the spatial relation between a reference RS and PUCCH. Reference RS can be SSB/CSI-RS/SRS. If the list has more than one element, MAC-CE selects a single element (see TS 38.321 [3], clause 5.18.8 and TS 38.213 [13], clause 9.2.2). |

| PUCCH-Resource field descriptions |
| --- |
| pucch-ResourceId |
| Identifier of the PUCCH resource. |

| PUCCH-ResourceSet field descriptions |
| --- |
| resourceList |
| PUCCH resources of format0 and format1 are only allowed in the first PUCCH resource set, i.e., in a PUCCH-ResourceSet with pucch-ResourceSetId = 0. This set may contain between 1 and 32 resources. PUCCH resources of format2, format3 and format4 are only allowed in a PUCCH-ResourceSet with pucch-ResourceSetId > 0. If present, these sets contain between 1 and 8 resources each. The UE chooses a PUCCH-Resource from this list as specified in TS 38.213 [13], clause 9.2.3. Note that this list contains only a list of resource IDs. The actual resources are configured in PUCCH-Config. |

PUCCH-ConfigCommon
The PUCCH-ConfigCommon IE is used to configure the cell specific PUCCH parameters.

| PUCCH-ConfigCommon information element |
| --- |
| ```
-- ASN1START
-- TAG-PUCCH-CONFIGCOMMON-START
PUCCH-ConfigCommon ::=          SEQUENCE {
    pucch-ResourceCommon            INTEGER (0..15)
OPTIONAL, -- Cond InitialBWP-Only
    pucch-GroupHopping              ENUMERATED { neither, enable, disable },
    hoppingId                       INTEGER (0..1023)
OPTIONAL, -- Need R
    p0-nominal                      INTEGER (-202..24)
OPTIONAL, -- Need R
    ...
}
-- TAG-PUCCH-CONFIGCOMMON-STOP
-- ASN1STOP
``` |

| PUCCH-ConfigCommon field descriptions |
| --- |
| pucch-ResourceCommon |
| An entry into a 16-row table where each row configures a set of cell-specific PUCCH resources/parameters. The UE uses those PUCCH resources only during initial access on the initial uplink BWP. Once the network provides a dedicated PUCCH-Config for that bandwidth part the UE applies that one instead of the one provided in this field (see TS 38.213 [13], clause 9.2) |

[ . . . ]
PUCCH-SpatialRelationInfo
The IE PUCCH-SpatialRelationInfo is used to configure the spatial setting for PUCCH transmission and the parameters for PUCCH power control, see TS 38.213, [13], clause 9.2.2.

| PUCCH-SpatialRelationInfo information element |
|---|
| -- ASN1START<br>-- TAG-PUCCH-SPATIALRELATIONINFO-START<br>PUCCH-SpatialRelationInfo ::=    SEQUENCE {<br>  pucch-SpatialRelationInfoId        PUCCH-SpatialRelationInfoId,<br>  servingCellId            ServCellIndex<br>OPTIONAL, -- Need S<br>  referenceSignal          CHOICE {<br>    ssb-Index              SSB-Index,<br>    csi-RS-Index            NZP-CSI-RS-ResourceId,<br>    srs                SEQUENCE {<br>      resource                           SRS-ResourceId,<br>      uplinkBWP                          BWP-Id<br>    }<br>  },<br>  pucch-PathlossReferenceRS-Id    PUCCH-PathlossReferenceRS-Id,<br>  p0-PUCCH-Id              p0-PUCCH-Id,<br>  closedLoopIndex          ENUMERATED { i0, i1 }<br>}<br>PUCCH-SpatialRelationInfoId ::=    INTEGER (1..maxNrofSpatialRelationInfos)<br>-- TAG-PUCCH-SPATIALRELATIONINFO-STOP<br>-- ASN1STOP |

| PUCCH-SpatialRelationInfo field descriptions |
|---|
| servingCellId |
| If the field is absent, the UE applies the ServCellId of the serving cell in which this PUCCH-SpatialRelationInfo is configured |

The Chairman Note of 3GPP TSG RAN WG1 Meeting #95 states:
Agreements:
When the CORESET ID field is 0, the TCI state ID field in the MAC-CE indicates a TCI-state in the PDSCH-Config.
  For CORESET #0,
    A UE follows the indicated TCI state or the QCL-D of the SSB of the active BWP which is selected through the random access procedure with a PRACH transmission not initiated by a PDCCH order that triggers a non-contention based random access procedure, whichever occurs more recently
    MAC CE based TCI indication delay for CORESET 0 is the same as MAC CE based TCI indication delay for other CORESETs
  A UE is expected to be configured only with TCI state of CSI-RS/TRS which is QCLed with an SSB based on the corresponding QCL type defined in section 5.1.5 in 38.214 for the active BWP.
    If different reference signals are configured in the TCI state, they should be QCLed with the same SSB with corresponding QCL type.
    Note: this does not require new way of handling QCL between the CSI-RS/TRS in the TCI-state and the QCLed SSB.
  It is up to NW whether to indicate the TCI-state for the CORESET #0 by the MAC-CE.
    If the TCI-state for the CORESET #0 is not indicated by the MAC-CE, the UE shall follow the SSB selected in the most recent random access procedure with a PRACH transmission not initiated by a PDCCH order that triggers a non-contention based random access procedure to receive any PDCCH with any RNTI on the CORESET #0.
  For CONNECTED state, if Type0/0A/2-CSS is SS #0, the UE monitors the common search space on the PDCCH monitoring occasions determined based on the association between an SSB index and PDCCH monitoring occasions according to Section 13 of T538.213 (which is called default association), where;
    the SSB is the one QCLed to the CSI-RS/TRS in the TCI-state indicated for the CORESET #0 or is the one selected through the random access procedure with a PRACH transmission not initiated by a PDCCH order that triggers a non-contention based random access procedure, whichever comes the recent.
RAN1 will ask RAN2 about handling of commonControlResourceSet if Option 1 is agreed.
TP for 213 section 5 will be discussed in RLM session.
For component 1 of FG2-4, if a UE reports X active TCI state(s), the UE is expected to be configured/activated with X active QCL assumption(s) for any PDSCH and any CORESETs for a given BWP of a serving cell.
TCI states applicable to CORESET #0 are (1) up to the first 64 sorted by TCI-state IDs, and (2) which contains CSI-RS sourced by SSB.
QCL assumption for CORESET #0 is updated by q_new after RACH procedure for BFR/RLM.
Note: In RRC connected mode, for CORESET other than #0, MAC-CE indicates a TCI-state in the PDSCH-Config RRC IE with the restriction of the TCI-state indexes configured for the CORESET RRC IE Note: it is gNB responsibility whether/how to ensure the performance of broadcast PDCCH whose QCL-TypeD is TRS Note: The active TCI state for the CORESET #0 is counted as 1 in the UE capability signalling For the case when a PRACH transmission is initiated by link recovery procedure, FFS the timing aspect— aim to conclude by Tuesday Agreements:

The two draft CRs in R1-1814052 (38.213 & 38.214) are endorsed

LS in R1-1814053 (Draft LS on CORESET 0, NTT DCM), which is approved with final LS in R1-1814068

Agreement

For multi-TRP/panel transmission, both multiple PDCCH and single PDCCH designs are supported in Rel-16
Applies for eMBB Agreement For multiple-PDCCH based multi-TRP/panel DL transmission, at least following enhancements can be studied for eMBB:

Multiple PDCCH enhancements/restrictions, including following
1: PDSCH scheduling restriction/indication, e.g.
The number of layers per PDSCH and the maximal of layers across all coordination TRPs
no/partial/full PDSCH overlapping at T/F domains, considering
associated rate matching mechanism
the maximum number of overlapped PDSCH per BWP per symbol
PDSCH mapping types
PDSCH scrambling
2: Configurations and monitoring of multiple PDCCH, e.g.
CORESET/search space configurations (including configuration details) for multi-TRP reception
The number of BD/CCE for multi-TRP reception
Independent DCI (strive to reuse Rel-15 DCI format/field) or dependent DCI (e.g. two-step DCI) considering
Associated DCI format/fields
Applicability to non-ideal backhaul and ideal backhaul
3: PDCCH/PDSCH processing/preparation timing for supporting multiple PDCCH UL control enhancement
4: UL ACK/NACK feedback for multiple TRP/panels, e.g.
separated A/N payload/DAI for PDSCH transmitted by different resources
whether need to or how to handle intra-UE A/N and PUSCH overlapping at time domain
whether/how to do joint A/N payload considering the applicability of backhaul assumption
5: CSI reporting enhancement for multiple TRP/panels, e.g.
CSI processing/timing, separated CSI reporting/reporting resources, and CSI multiplexing with A/N
Whether/how to use joint CSI reporting and associated reporting resource Whether and how to enhance HARQ, e.g.
Increasing the number of HARQ Other enhancements are not excluded.

Note that for the sake of discussion, the UE may assume that the UE may receive DL transmission from multiple TRP within a CP with single/multiple FFT windows. Companies are encouraged to clarify time/frequency synchronization assumptions for proposed multi-TRP/panel DL transmission.

Note that CSI measurement enhancement for NCJT considering backhaul condition and semi-static network coordination are not excluded. Companies are encouraged to evaluate CSI measurement schemes in Ad-Hoc and RAN1 #96.

Agreement

Study for URLLC reliability/robustness enhancement with multi-TRP/panel/beam, including the case of ideal backhaul
For PDSCH/PUSCH where the same TB is transmitted including
1: the number of TRP/panel/beams
2: Configuration/indication mechanism of TB repetition
Other enhancements are not excluded.
For PDCCH/PUCCH
1: the number of TRP/panel/beams
2: Repetition/Diversity of DCI/UCI
Other enhancements are not excluded.

The Chairman Note of 3GPP TSG RAN WG1 Meeting Ad-Hoc Meeting 1901 states:

Agreement

For multi-DCI based multi-TRP/panel transmission, the total number of CWs in scheduled PDSCHs, each of which is scheduled by one PDCCH, is up to X and also the total number of MIMO layers of scheduled PDSCHs is up to reported UE MIMO capability, if resource allocation of PDSCHs are overlapped.
X=2

Agreement

For multiple-PDCCH based multi-TRP/panel transmission for eMBB, for the purposes of PDCCH detection, UE does not assume any dependency amongst the multiple PDCCHs Agreement For multiple-PDCCH based multi-TRP/panel downlink transmission for eMBB,
Separate ACK/NACK payload/feedback for received PDSCHs is supported Agreement For a UE supporting multiple-PDCCH based multi-TRP/panel transmission and each PDCCH schedules one PDSCH, at least for eMBB with non-ideal backhaul, down-select one alternative from following in RAN1 96
Alt 1: the UE may be scheduled with full/partially/non-overlapped PDSCHs at time and frequency domain by multiple PDCCHs
Alt 2: the UE can be only scheduled with full/non-overlapped PDSCHs at time and frequency domain by multiple PDCCHs
Alt 3: the UE may be scheduled with full/partially/non-overlapped PDSCHs at time and frequency domain by multiple PDCCHs with following restrictions:
Same DMRS configuration with respect to actual number of front loaded DMRS symbol(s), the actual number of additional DMRS, the DMRS symbol location and DMRS configuration type shall be assumed by the UE for full/partially overlapping PDSCHs.
The UE is not expected to have more than one TCI state with DMRS ports within the same CDM group for full/partially overlapping PDSCHs Full scheduling information for receiving a PDSCH is indicated and carried only by the corresponding PDCCH.

Other restrictions are not excluded, for example BWP switching

Agreement TCI indication framework shall be enhanced in Rel-16 at least for eMBB:
  Each TCI code point in a DCI can correspond to 1 or 2 TCI states
    When 2 TCI states are activated within a TCI code point, each TCI state corresponds to one CDM group, at least for DMRS type 1

The Chairman Note of 3GPP TSG RAN WG1 Meeting #96 states:

Agreement

For multi-DCI based multi-TRP/panel transmission, the total number of CWs in scheduled PDSCHs, each of which is scheduled by one PDCCH, is up to 2.

Agreement

For TCI state configuration in order to enable one or two TCI states per a TCI code point,
  MAC-CE enhancement to map one or two TCI states for a TCI code point where further detailed design is determined in RAN2.

Include in LS to RAN2

R1-1903637 Draft LS on support of Enhancements on multi-TRP/panel transmission

The draft LS is endorsed in R1-1903697 with updates on new RAN1 agreements.

Agreement

To support multiple-PDCCH based multi-TRP/panel transmission with intra-cell (same cell ID) and inter-cell (different Cell IDs), following RRC configuration can be used to link multiple PDCCH/PDSCH pairs with multiple TRPs
  one CORESET in a "PDCCH-config" corresponds to one TRP Agreement For separate ACK/NACK payload/feedback for received PDSCHs where multiple DCIs are used,
  PUCCH resources conveying ACK/NACK feedback can be TDM with separated HARQ-ACK codebook.
For issues related to PUCCH resources, study including:
  FFS: if PUCCH resources conveying ACK/NACK feedback are overlapped at time, whether predefined dropping rule is needed to drop ACK/NACK feedback.
  FFS: how to handle ACK/NACK overlapping with CSI reporting for different TRPs
  FFS: how to handle PUCCH overlapping with PUSCH at the time domain for different TRPs
  FFS: whether the UE can assume simultaneous ACK/NACK transmission from multiple PUCCH resources, and associated details of configurations/indication/UE capability.

Include in LS to RAN2

There are some related agreements from RAN1 #87 to RAN1 #94b as follows:
  For coordination schemes
    Agreements in RAN1 #87:
      NR supports both semi-static and dynamic network coordination schemes
        The network coordination schemes should consider at least the following schemes:
          DPS/DPB
          CS/CB
          Non-coherent JT
          Coherent JT
          eICIC Whether each scheme requires specification support or not is FFS Agreements in RAN1 #87:
  In supporting semi-static and dynamic network coordination schemes in NR, different coordination levels should be considered.
    E.g., centralized and distributed scheduling, the delay assumption used for coordination schemes, etc.

Agreements in RAN1 #87:
  NR should consider advanced receiver at the UE, by studying:
    Joint reception of multiple data streams from one or more TRPs/panels
    Interference cancellation/suppression
      One or more data stream(s)
      Reference signal(s)
    Potential notification the UE of the information related to interfering signals, e.g., MCS, CSI-RS ports, DM-RS pattern and transport block size, # of layers, MIMO mode, etc.
    Potential blind detection of information regarding interference
    Potential joint channel estimation and reception of data
    Potentially different numerologies (e.g., tone spacing, etc.)

Agreements in RAN1 #87:
  Study network side calibration to assist cross-TRP and cross-panel operation, e.g.:
    Necessity of same-panel calibration and specification impact, if any
    Potential UE-aided calibration: transmit/receive calibration signaling between gNB and UE(s)
      E.g., UE-aided calibration may use feedback from UE to gNB
    Other methods to assist cross-TRP and cross-panel operation are not precluded Agreements in NR Adhoc #1:
  Support NR downlink transmission of same NR-PDSCH data stream(s) from multiple TRPs at least with ideal backhaul, and different NR-PDSCH data streams from multiple TRPs with both ideal and non-ideal backhaul:
    Note: the case of supporting same NR-PDSCH data stream(s) may or may not have spec impact (to be further studied especially comparing performance/complexity relative to standard-transparent operation)
    Study how to perform resource scheduling especially with respect to whether to use one or more NR-PDCCH for a UE
      Consider, e.g., backhaul conditions, UE complexity, feasibility of NR-PDCCH demodulation if from multiple TRPs, NR-PDCCH overhead, performance, etc.
    Study network coordination schemes with ideal & non-ideal backhaul links, considering
      Fast CSI acquisition
        e.g. coordinated TRPs obtain CSIs through physical air interface
        e.g. SRS configuration exchanging between different TRPs
      Other techniques are not precluded Agreements in RAN1 #88bis:
Support NR reception of at least one but no more than two of the following Single NR-PDCCH corresponding to the same NR-PDSCH data layers from multiple TRPs within the same carrier
  Note that: this is intended to have spec impact
Single NR-PDCCH corresponding to different NR-PDSCH data layers from multiple TRPs within the same carrier
Multiple NR-PDCCH corresponding to different NR-PDSCH data layers from multiple TRPs within the same carrier
In case of multiple NR-PDCCH, consider the following for the reduction of UE PDCCH detection complexity.
  Note the following may or may not have RAN1 specification impact.
  Note that different NR-PDSCH data layers from single TRP is special case.
  The alignment of PDCCH generation rules among TRPs, e.g. one identical control resource set across TRPs
  Signalling the maximum number of multiple NR-PDCCH reception via L1 and/or high layer signalling
  Other techniques can be considered.
Agreements in RAN1 #89:
  Adopt the following for NR reception:
    Single NR-PDCCH schedules single NR-PDSCH where separate layers are transmitted from separate TRPs
    Multiple NR-PDCCHs each scheduling a respective NR-PDSCH where each NR-PDSCH is transmitted from a separate TRP
    Note: the case of single NR-PDCCH schedules single NR-PDSCH where each layer is transmitted from all TRPs jointly can be done in a spec-transparent manner
      Note: CSI feedback details for the above case can be discussed separately
For PDCCH
Agreements in RAN1 #89:
  For the reception of multiple NR-PDCCHs each scheduling a respective NR-PDSCH where each NR-PDSCH is transmitted from a separate TRP, NR supports:
    The maximum supported number of NR-PDCCHs/PDSCHs is either 2 or 3 or 4
      To be decided next meeting
      FFS signaling (explicit or implicit) of the maximum number of NR-PDCCHs/PDSCHs for a UE, including the case of signaling a single NR-PDCCH/PDSCH
Agreements in RAN1 #90:
  The maximum supported number of NR-PDCCHs corresponding to scheduled NR-PDSCHs that a UE can be expected to receive in a single slot is 2 on a per component carrier basis in case of one bandwidth part for the component carrier
    (Working assumption) In this case, at most a total of 2 CWs over the scheduled NR-PDSCHs
For PDSCH
Agreements in NR Adhoc #2:
  The maximum supported number of unicast and dynamically scheduled NR-PDSCHs a UE can be expected to simultaneously receive is 2 on a per component carrier basis in case of one bandwidth part for the component carrier
Agreements in NR Adhoc #2:
  Send LS to RAN2 (cc RAN3) to inform about RAN1 agreement from RAN1 #89 on the support of multiple PDSCHs transmission to the UE to support NC-JT operation
  Include in the LS the following content
    RAN1 agreement from RAN1 #89
    RAN1 is considering different scenarios including TRPs connected with ideal and non-ideal backhaul link, TRPs with same and different cell IDs, etc. to provide an increased throughput for users covered by different TRPs, and greater radio link reliability through dual connectivity-like operation
    RAN1 thinks that the above agreement may have impact on RAN2 specification
    Actions: RAN1 asks RAN2 to take into account the above agreement in RAN2's work and provide any information that may be relevant for future RAN1's work on this topic
LS draft and endorsed in R1-1711820. Final LS agreed in R1-1712000

One or multiple of following terminologies may be used hereafter:
  BS: A network central unit or a network node in NR which is used to control one or multiple TRPs which are associated with one or multiple cells. Communication between BS and TRP(s) is via fronthaul. BS could also be referred to as central unit (CU), eNB, gNB, or NodeB.
  TRP: A transmission and reception point provides network coverage and directly communicates with UEs. TRP could also be referred to as distributed unit (DU) or network node.
  Cell: A cell is composed of one or multiple associated TRPs, i.e. coverage of the cell is composed of coverage of all associated TRP(s). One cell is controlled by one BS. Cell could also be referred to as TRP group (TRPG).
  Serving Beam: A serving beam for a UE is a beam generated by a network node (e.g. TRP) which is configured to be used to communicate with the UE (e.g. for transmission and/or reception).
  Candidate Beam: A candidate beam for a UE is a candidate of a serving beam. A serving beam may or may not be a candidate beam.

In NR Rel-15, beamforming technology are adopted to conquer the high power penetration in high frequency band, e.g. above 6 GHz. Hence, a gNB and a UE may both use some transmission beams and/or receiving beams to make high throughput data in such high frequency band reliable. How to choose suitable transmission beam and/or receiving beam has played an important role in NR Rel-15. Beam indication for various channels and reference signals are also well discussed and captured in specification along with the development of NR.

In NR Rel-15, beam indication for UL (Uplink) transmission may be different based on the indication method. For example, for UL transmission scheduled by DCI (Downlink Control Information) format 0_1, a UE transmits scheduled UL transmission based on the SRI (SRS resource indicator) filed indicated in DCI format 0_1. The SRI field indicates a spatial relation for the UE to follow, and, hence, the UE knows how to transmit the scheduled PUSCH. For DCI format 0_0, since there is no SRI field indicated, the UE transmits the PUSCH scheduled by DCI format 0_0 by a default beam or default spatial relation. The default beam or default spatial relation is the beam or spatial relation for transmitting a PUCCH (Physical Uplink Control Channel) resource with spatial relation and lowest resource ID within active UL BWP (Bandwidth Part).

When it comes to releases beyond NR Rel-15, such a default beam derivation may need to be further considered or modified. For example, in NR Rel-16, the UE may have higher chance to be served by multiple transmission nodes (e.g. multiple TRP) in a serving cell, wherein the multiple transmission nodes may belong to the same network. In details, each PUSCH indicated by DCI format 0_0 may be scheduled by different TRP. Under this consideration, even two PUSCHs indicated by DCI format 0_0 is intended for different TRPs, they are transmitted by the same default beam, if following Rel-15 behavior. However, the default beam may not be suitable for transmitting one of the scheduling TRP. For example, a UE is served by two TRPs (TRP A and TRP B), wherein TRP A is located at the right side and TRP B is located at the left side respectively. It may happen that the default beam is pointed to TRP A only. It is imagined a performance degradation on PUSCH reception occurs when TRP B schedules the UE by DCI format 0_0.

Hence, some mechanisms to tackle with UL default beam determination for multiple TRP scenario is needed. In this invention, the following concepts and/or embodiments are provided, which can be at least (but not limited to) used to handle this issue.

I. Concept 1

One general concept of the present invention is that if a UE is scheduled a PUSCH indicated by a DCI format without indicating spatial relation or transmission beam to transmit the PUSCH (e.g. DCI format 0_0), the UE transmits the PUSCH by a default spatial relation. In one embodiment, the default spatial relation may be selected or derived not only based on a PUCCH resource with indicated spatial relation and lowest resource ID within active BWP, but also based on at least one other factors.

II. Concept 2

Another general concept of the present invention is that if a UE is scheduled a PUSCH indicated by a DCI format without indicating spatial relation or transmission beam to transmit the PUSCH (e.g. DCI format 0_0), the UE transmits the PUSCH by a default spatial relation. In one embodiment, the default spatial relation may be selected or derived by a PUCCH resource, wherein the PUCCH resource may be indicated or configured with spatial relation. The default spatial relation may be pointed to or associated with a TRP. The TRP may schedule the PUSCH or transmit the DCI format 0_0.

Additionally or alternatively, the default spatial relation may be pointed to or associated with the panel at network side to receive the PUSCH. The default spatial relation may be the indicated or configured spatial relation for the PUCCH resource.

Any combination of above concepts can be jointly combined or formed to a new embodiment. The following embodiments can be used to solve at least (but not limited to) the issue mentioned above. The below descriptions could be applicable or common to the following embodiments.

In one embodiment, a UE is configured with and/or is served in a serving cell by a network, wherein there is one or more BWP in the serving cell and wherein an active BWP may be activated in the serving cell. Furthermore, there may be an activated or active DL BWP of the UE in the serving cell, or an activated or active UL BWP of the UE in the serving cell. The UE may be configured or provided with an initial BWP in the serving cell.

In one embodiment, the UE could be served by a first TRP and/or a second TRP in the serving cell. The first TRP may schedule a DL or UL transmission to the UE. The second TRP may schedule a DL or UL transmission to the UE. The first TRP and/or the second TRP may be one of transmission/reception points of the network.

In one embodiment, the network may comprise a first network panel and/or a second network panel. The first and/or the second network panel may be used to receive UL transmission from the UE. The UE may be scheduled a PUSCH by the network. The UE may be scheduled a PUSCH by the first TRP. The UE may be scheduled a PUSCH by the second TRP. The PUSCH may be indicated or scheduled by a DCI format without a field indicating a spatial relation or beam or transmission filter for transmitting the PUSCH. The PUSCH may be indicated by DCI format 0_0. The UE may transmit the PUSCH via a default spatial relation.

In one embodiment, there may be a TRP identifier. A TRP identifier may be known for the UE and/or the network. A TRP identifier may be configured or indicated to the UE by the network. The UE may derive the TRP identifier explicitly or implicitly. More specifically, the UE may derive the TRP identifier explicitly or implicitly from other configurations.

In one embodiment, the TRP identifier may be an index or ID of a higher layer configuration or parameter. The TRP identifier may be index or ID of a configuration or parameter, e.g. at least one of the followings:
  CORESET (Control Resource Set) ID,
  TCI (Transmission Configuration Indicator) state ID,
  index or ID of a group of CORESET (e.g. ID of one or more CORESETs),
  index or ID of a group of TCI states (e.g. ID of one or more TCI states),
  index or ID of PDCCH (Physical Downlink Control Channel) configuration,
  index or ID of PUCCH (Physical Uplink Control Channel) configuration,
  index or ID of PDSCH (Physical Downlink Shared Channel) configuration, and/or
  index or ID of PUSCH (Physical Uplink Shared Channel) configuration.

The TRP identifier may be one of candidate or possible value of index or ID of the configuration or parameter.

In one embodiment, the TRP identifier may be associated with or related to one or more parameters within a configuration, e.g. a CORESET within a PDCCH configuration, a parameter within a CORESET. The TRP identifier may be indicated by MAC-CE (Medium Access Control-Control Element) or related to MAC-CE signaling. The TRP identifier may be associated with or related to a DCI or one or more fields in a DCI. The TRP identifier may be used to differentiate or recognize a TRP.

In one embodiment, when a UE is scheduled a DL or UL transmission, the UE may be able to differentiate or recognize the TRP scheduling the DL or UL transmission by an explicit or implicit method. When a UE is scheduled a DL or UL transmission, the UE may be able to differentiate or recognize the TRP scheduling the DL or UL transmission by the TRP identifier.

In one embodiment, the UE may be able to differentiate or recognize the TRP scheduling a DL or UL transmission by the TRP identifier. The PUSCH may be scheduled by a DCI format, wherein the DCI format is associated with a first TRP identifier. The PUSCH may be scheduled by a DCI format, wherein the DCI format is associated with a second TRP identifier. The PUSCH may be scheduled by a DCI format, wherein the DCI format is scheduled or transmitted by a CORSET associated with the first TRP identifier. The PUSCH may be scheduled by a DCI format, wherein the DCI format is scheduled or transmitted by a CORSET associated with the second TRP identifier. The UE may derive or be indicated the first TRP identifier and/or the second TRP identifier. The first TRP identifier may be associated with or related to the first TRP. The second TRP identifier may be associated with or related to the second TRP. The first TRP identifier may be replaced with or associated with a first value of the TRP identifier, vice versa. The second TRP identifier may be replaced with or associated with a second value of the TRP identifier, vice versa.

III. Embodiment 1

In one embodiment, the UE may be configured or provided with one or more PUCCH resources within the active BWP or the active UL BWP. The PUCCH resource ID of the one or more PUCCH resources may be configured or set by being associated with or related to one or more TRP serving the UE.

In one embodiment, how respective PUCCH resource ID of the one or more PUCCH resources is configured or set could be determined based on a TRP serving the UE, which is associated with or related to the one or more PUCCH resources. The PUCCH resource ID of a PUCCH resource could be configured or set based on the spatial relation configured to the PUCCH resource. Alternatively, the PUCCH resource ID of a PUCCH resource could be configured or set based on a TRP or a network panel, wherein the TRP or the network panel is associated with or related to the spatial relation configured to the PUCCH resource. Also, the PUCCH resource ID of a PUCCH resource could be configured or set based on a TRP or a network panel, wherein the UE is able to transmit an UL transmission to the TRP or the network panel by using the spatial relation configured to the PUCCH resource.

In one embodiment, how respective PUCCH resource ID of the one or more PUCCH resources is configured or set could be determined based on respective spatial relation of the one or more PUCCH resources. Alternatively, how respective PUCCH resource ID of the one or more PUCCH resources is configured or set could be determined based on a TRP serving the UE or a network panel, which is associated with or related to respective spatial relation of the one or more PUCCH resources.

In one embodiment, the order of PUCCH resource ID of a PUCCH resource may be associated with or related to the TRP or the network panel or the TRP identifier that the spatial relation configured within the PUCCH resource is associated with or related to. The order of PUCCH resource ID of two different PUCCH resources may also be associated with or related to respective TRP or TRP identifier that the spatial relation configured within the two different PUCCH resources is associated with or related to. Additionally, the order of PUCCH resource ID of two different PUCCH resources may be associated with or related to respective network panel that the spatial relation configured within the two different PUCCH resources is associated with or related to. Furthermore, the order of PUCCH resource ID of two different PUCCH resources may be associated with or related to the order of respective TRP or TRP identifier that the two different PUCCH resource is associated with or related to. In addition, the order of PUCCH resource ID of two different PUCCH resources may be associated with or related to the order of respective network panel that the two different PUCCH resource is associated with or related to.

In one embodiment, the network may configure PUCCH resource ID of a PUCCH resource based on the TRP that the PUCCH resource is associated with or related to. The network may also configure PUCCH resource ID of a PUCCH resource based on the network panel that the PUCCH resource is associated with or related to. Additionally, the network may configure PUCCH resource ID of a PUCCH resource based on the TRP identifier that the PUCCH resource is associated with or related to. Furthermore, the network may configure the order of a PUCCH resource among all PUCCH resource within the same active UL BWP or the same active BWP based on the TRP that the PUCCH resource is associated with or related to. In addition, the network may configure the order of a PUCCH resource among all PUCCH resource within the same active UL BWP or the same active BWP based on the network panel that the PUCCH resource is associated with or related to. Also, the network may configure the order of a PUCCH resource among all PUCCH resource within the same active UL BWP or the same active BWP based on the TRP identifier that the PUCCH resource is associated with or related to.

In one embodiment, the network may configure the order of PUCCH resource ID of two PUCCH resource within the same active UL BWP or the same active BWP based on (the order of) the respective TRP that the two PUCCH resource is associated with or related to. The network may also configure the order of PUCCH resource ID of two PUCCH resource within the same active UL BWP or the same active BWP based on (the order of) the respective network panel that the PUCCH resource is associated with or related to. Furthermore, the network may also configure the order of PUCCH resource ID of two PUCCH resource within the same active UL BWP or the same active BWP based on (the order of) the respective TRP identifier that the PUCCH resource is associated with or related to.

In one embodiment, the PUCCH resource with the lowest resource ID may be associated with or related to the first TRP or the first network panel. The PUCCH resource with the lowest resource ID within the active (UL) BWP may also be associated with or related to the first TRP or the first network panel. The PUCCH resource with the lowest resource ID may comprise a first spatial relation, wherein the first spatial relation is associated with or related to the first TRP. Also, the PUCCH resource with the lowest resource ID may comprise a first spatial relation, wherein the first spatial relation is associated with or related to the first TRP identifier. In addition, the PUCCH resource with the lowest resource ID may comprise a first spatial relation, wherein the UE is able to transmit UL transmission to the first TRP or the first network panel via the first spatial relation.

In one embodiment, the PUCCH resource with the second lowest resource ID may be associated with or related to the second TRP or the second network panel. The PUCCH resource with the second lowest resource ID within the active BWP may also be associated with or related to the second TRP or the second network panel. Additionally, the PUCCH resource with the second lowest resource ID may comprise a second spatial relation, wherein the second spatial relation is associated with or related to the second TRP. Furthermore, the PUCCH resource with the second lowest resource ID may comprise a second spatial relation, wherein the second spatial relation is associated with or related to the second TRP identifier. In addition, the PUCCH resource with the second lowest resource ID may comprise a second spatial relation, wherein the UE is able to transmit UL transmission to the second TRP or the second network panel via the second spatial relation.

In one embodiment, the default spatial relation may be selected or derived by a PUCCH resource. In particular, the default spatial relation may be selected or derived by a PUCCH resource, wherein the PUCCH resource is configured or indicated a spatial relation. In addition, the default spatial relation may be selected or derived by a PUCCH resource, wherein the PUCCH resource is configured within the active BWP or the active UL BWP. The default spatial relation may be the first spatial relation or the second spatial relation.

In one embodiment, if the PUSCH is scheduled by the first TRP, the UE may transmit the PUSCH via the first spatial relation. If the PUSCH is scheduled by a CORESET associated with the first TRP or the first TRP identifier, the UE may transmit the PUSCH via the first spatial relation. If the PUSCH is scheduled by a DCI or DCI format associated with the first TRP or the first TRP identifier, the UE may transmit the PUSCH via the first spatial relation.

In one embodiment, if the PUSCH is associated with or related to the first TRP identifier, the UE may transmit the PUSCH via the first spatial relation. If the PUSCH is indicated or scheduled to be received by the first network panel, the UE may transmit the PUSCH via the first spatial relation. If the PUSCH is scheduled by the second TRP, the UE may transmit the PUSCH via the second spatial relation. If the PUSCH is scheduled by a CORESET associated with the second TRP or the second TRP identifier, the UE may transmit the PUSCH via the second spatial relation. If the PUSCH is scheduled by a DCI or DCI format associated with the second TRP or the second TRP identifier, the UE may transmit the PUSCH via the second spatial relation.

In one embodiment, if the PUSCH is associated with or related to the second TRP identifier, the UE may transmit the PUSCH via the second spatial relation. If the PUSCH is indicated with or scheduled to be received by the second network panel, the UE may transmit the PUSCH via the second spatial relation.

In one embodiment, the default spatial relation could be the spatial relation of a PUCCH resource with the lowest resource ID. Alternatively, the default spatial relation could be the spatial relation of a PUCCH resource with the second lowest resource ID. The default spatial relation could also be the spatial relation of a PUCCH resource with the lowest resource ID within the active (UL) BWP. Alternatively, the default spatial relation could be the spatial relation of a PUCCH resource with the second lowest resource ID within the active (UL) BWP.

IV. Embodiment 2

In one embodiment, each of the one or more PUCCH resources configured to the UE may be associated with or related to a TRP or a network panel. Each of the one or more PUCCH resources configured to the UE may also be associated with or related to a TRP identifier. Furthermore, each of the one or more PUCCH resources configured to the UE may be associated with or identified by a PUCCH group ID.

In one embodiment, each of the one or more PUCCH resources configured to the UE within the active UL BWP or the active BWP may be associated with or related to a TRP or a network panel. Each of the one or more PUCCH resources configured to the UE within the active UL BWP or the active BWP may also be associated with or related to a TRP identifier.

In one embodiment, one or more parameters included in a PUCCH resource may be associated with or related to a TRP or a network panel, a TRP identifier. Furthermore, one or more parameters included in a PUCCH resource may be associated with or related to by a PUCCH group ID. For example, spatial relation included in a PUCCH resource may be associated with or related to a TRP or a network panel, or a PUCCH group ID. A TRP identifier may be associated with or related to a PUCCH group ID. A TRP identifier may also be a PUCCH group ID.

In one embodiment, spatial relation included in a PUCCH resource may be associated with or related to a TRP or a network panel, which may mean that the UE is able to transmit an UL transmission to the TRP or the network panel via the spatial relation. One or more PUCCH resources configured to the UE within the active (UL) BWP may be associated with or related to the first TRP or the first network panel. One or more PUCCH resources configured to the UE within the active (UL) BWP may also be associated with or related to the first TRP identifier.

In one embodiment, a first set of PUCCH resource(s) may comprise one or more PUCCH resources, which are configured to the UE within the active (UL) BWP, and associated with or related to the first TRP or the first network panel. A first set of PUCCH resource(s) may also comprise one or more PUCCH resources, which are configured to the UE within the active (UL) BWP, and associated with or related to the first TRP identifier. The first set of PUCCH resource(s) may be associated with or related to the first TRP or the first network panel. The first set of PUCCH resource(s) may also be associated with or related to the first TRP identifier.

In one embodiment, the first set of PUCCH resource(s) may be identified by a first PUCCH set ID. Each PUCCH resource within the first set of PUCCH resource(s) may be associated with or related to the first TRP or the first network panel, the first TRP identifier, or the first PUCCH set ID. The first set of PUCCH resource(s) or each PUCCH resource in the first set could be indicated or configured with the first PUCCH set ID.

In one embodiment, one or more parameters included in each PUCCH resource within the first set of PUCCH resource(s) is associated with or related to the first TRP or the first network panel, or to the first TRP identifier.

In one embodiment, a second set of PUCCH resource(s) may comprise one or more PUCCH resources, which are configured to the UE within the active (UL) BWP, and associated with or related to the second TRP or the second network panel, or to the second TRP identifier. The second set of PUCCH resource(s) may be associated with or related to the second TRP or the second network panel, or to the second TRP identifier.

In one embodiment, the second set of PUCCH resource(s) may be identified by a second PUCCH set ID. Each PUCCH resource within the second set of PUCCH resource(s) may be associated with or related to the second TRP or the second network panel, to the second TRP identifier, or to the second PUCCH set ID. The second set of PUCCH resource(s) or each PUCCH resource in the second set could be configured with the second PUCCH set ID.

In one embodiment, one or more parameters included in each PUCCH resource within the second set of PUCCH resource(s) may be associated with or related to the second TRP or the second network panel, or to the second TRP identifier.

In one embodiment, the first TRP identifier may be associated with o related to the first PUCCH set ID. The second TRP identifier may be associated with or related to the second PUCCH set ID. The first TRP identifier may be the first PUCCH set ID. The second TRP identifier may be the second PUCCH set ID.

In one embodiment, the first set of PUCCH resource(s) and the second set of PUCCH resource(s) are configured by the same PUCCH configuration within the active (UL) BWP. There may be only one PUCCH configuration configured within the active (UL) BWP. The first set of PUCCH resource(s) may be indicated by RRC signaling, or MAC-CE, or DCI signaling. The second set of PUCCH resource(s) may be indicated by RRC signaling, or MAC-CE, or DCI signaling.

In one embodiment, the default spatial relation may be selected or derived by a PUCCH resource. In particular, the default spatial relation may be selected or derived by a PUCCH resource, wherein the PUCCH resource is configured or indicated a spatial relation. The default spatial relation may also be selected or derived by a PUCCH resource, wherein the PUCCH resource is configured within the active BWP or the active UL BWP.

In one embodiment, if or when the PUSCH is scheduled by the first TRP, the UE may transmit the PUSCH via the spatial relation of a first PUCCH resource. If or when the PUSCH is scheduled by a CORESET associated with the first TRP or the first TRP identifier, the UE may transmit the PUSCH via the spatial relation of a first PUCCH resource. If or when the PUSCH is scheduled by a DCI or DCI format associated with the first TRP or the first TRP identifier, the UE may transmit the PUSCH via the spatial relation of a first PUCCH resource.

In one embodiment, if or when the PUSCH is associated with or related to the first TRP, the UE may transmit the PUSCH via the spatial relation of a first PUCCH resource. If or when the PUSCH is indicated or scheduled to be received by the first network panel, the UE may transmit the PUSCH via the spatial relation of a first PUCCH resource.

In one embodiment, if or when the PUSCH is scheduled by the second TRP, the UE may transmit the PUSCH via the spatial relation of a second PUCCH resource. If or when the PUSCH is scheduled by a CORESET associated with the second TRP or the second TRP identifier, the UE may transmit the PUSCH via the spatial relation of a second PUCCH resource. If or when the PUSCH is scheduled by a DCI or DCI format associated with the second TRP or the second TRP identifier, the UE may transmit the PUSCH via the spatial relation of a second PUCCH resource.

In one embodiment, if or when the PUSCH is associated with or related to the second TRP, the UE may transmit the PUSCH via the spatial relation of a second PUCCH resource. If or when the PUSCH is indicated or scheduled to be received by the second network panel, the UE may transmit the PUSCH via the spatial relation of a second PUCCH resource.

In one embodiment, the default spatial relation could be the spatial relation of a first PUCCH resource. Additionally or alternatively, the default spatial relation could be the spatial relation of a second PUCCH resource.

In one embodiment, the first PUCCH resource could be a PUCCH resource comprising the lowest PUCCH resource ID among all PUCCH resource in the first set of PUCCH resource(s). The first PUCCH resource could also be a PUCCH resource comprising the lowest PUCCH resource ID among all PUCCH resources with configured or indicated spatial relation in the first set of PUCCH resource(s). Furthermore, the first PUCCH resource could be a PUCCH resource comprising the highest PUCCH resource ID among all PUCCH resources in the first set of PUCCH resource(s). The first PUCCH resource could further be a PUCCH resource comprising the highest PUCCH resource ID among all PUCCH resources with configured or indicated spatial relation in the first set of PUCCH resource(s).

In one embodiment, the first PUCCH resource could be a PUCCH resource in the first set of PUCCH resource(s). The second PUCCH resource could be a PUCCH resource comprising the lowest PUCCH resource ID among all PUCCH resource in the second set of PUCCH resource(s). The second PUCCH resource could also be a PUCCH resource comprising the lowest PUCCH resource ID among all PUCCH resources with configured or indicated spatial relation in the second set of PUCCH resource(s). In addition, the second PUCCH resource could be a PUCCH resource comprising the highest PUCCH resource ID among all PUCCH resources in the second set of PUCCH resource(s). Furthermore, the second PUCCH resource could be a PUCCH resource comprising the highest PUCCH resource ID among all PUCCH resources with configured or indicated spatial relation in the second set of PUCCH resource(s). In addition, the second PUCCH resource could be a PUCCH resource in the second set of PUCCH resource(s).

In one embodiment, the first set of PUCCH resource(s) could be identified by configured or indicated spatial relation. For example, one or more PUCCH resource(s) indicated or configured with a (same) first spatial relation could be the first set of PUCCH resource(s). The second set of PUCCH resource(s) could be identified by configured or indicated spatial relation. For example, one or more PUCCH resource(s) indicated or configured with a (same) second spatial relation could be the second group of PUCCH resource(s).

V. Embodiment 3

In one embodiment, the PUSCH may be indicated by a DCI format with a field indicating a spatial relation or beam or transmission filter for transmitting the PUSCH. The PUSCH may be indicated by DCI format 0_1. The UE may transmit the PUSCH via a spatial relation or beam or transmission filter indicated in DCI format 0_1.

In one embodiment, each of the one or more PUCCH resources configured to the UE may be associated with or related to a TRP or a network panel, or to a TRP identifier. One or more parameters included in a PUCCH resource may be associated with or related to a TRP or a network panel, or to a TRP identifier. For example, spatial relation included in a PUCCH resource may be associated with or related to a TRP or a network panel. In particular, spatial relation included in a PUCCH resource may be associated with or related to a TRP or a network panel, which may mean that the UE is able to transmit an UL transmission to the TRP or the network panel via the spatial relation.

In one embodiment, the default spatial relation may be selected or derived by a PUCCH resource. In particular, the default spatial relation may be selected or derived by a PUCCH resource, wherein the PUCCH resource is configured or indicated a spatial relation. Furthermore, the default spatial relation may be selected or derived by a PUCCH resource, wherein the PUCCH resource is configured within the active BWP or the active UL BWP.

In one embodiment, the PUCCH resource may comprise the lowest PUCCH resource ID among all PUCCH resources configured within the active UL BWP or the active BWP. The PUCCH resource may also comprise the lowest PUCCH resource ID among all PUCCH resources configured or indicated spatial relation and/or configured within the active UL BWP or the active BWP. The PUCCH resource may further comprise the highest PUCCH resource ID among all PUCCH resources configured within the active UL BWP or the active BWP. In addition, the PUCCH resource may comprise the highest PUCCH resource ID among all PUCCH resources configured or indicated spatial relation and/or configured within the active UL BWP or the active BWP.

In one embodiment, the spatial relation of the PUCCH resource could be associated with or related to the first TRP or the first network panel, or to the first TRP identifier. The UE may be able to transmit an UL transmission to the first TRP or the first network panel via the spatial relation of the PUCCH resource.

Alternatively, the spatial relation of the PUCCH resource may be neither associated with nor related to the second TRP or the second network panel. Furthermore, the spatial relation of the PUCCH resource may be neither associated with nor related to the second TRP identifier. The UE may not be able to transmit an UL transmission to the second TRP or the second network panel via the spatial relation of the PUCCH resource. The default spatial relation could be the spatial relation of the PUCCH resource.

In one embodiment, if the PUSCH is scheduled by the first TRP, the PUSCH may be scheduled by a DCI format with or without a field indicating a spatial relation or transmission beam or transmission filter. If the PUSCH is scheduled by the first TRP, the PUSCH may be scheduled by DCI format 0_0. If the PUSCH is scheduled by the first TRP, the PUSCH may be scheduled by DCI format 0_1. If the PUSCH is scheduled by the first TRP, the network or the first TRP may use a DCI format to indicate the PUSCH to the UE, wherein the DCI format is with or without a field indicating a spatial relation or transmission beam or transmission filter. If the PUSCH is scheduled by the first TRP, the network or the first TRP may use DCI format 0_0 or DCI format 0_1 to indicate the PUSCH to the UE. If the PUSCH is scheduled by the first TRP, the network or the first TRP may be allowed to use DCI format 0_0 or DCI format 0_1 to indicate the PUSCH to the UE.

In one embodiment, "the PUSCH is scheduled by the first TRP" may mean or be referred to that the PUSCH is scheduled by a CORESET associated with the first TRP or the first TRP identifier. "The PUSCH is scheduled by the first TRP" may mean or be referred to that the PUSCH is scheduled by a DCI or DCI format associated with the first TRP or first TRP identifier.

In one embodiment, if the PUSCH is scheduled by the second TRP, the PUSCH may not be scheduled by a DCI format without a field indicating a spatial relation or transmission beam or transmission filter. If the PUSCH is scheduled by the second TRP, the PUSCH may not be scheduled by a DCI format, wherein the UE may need to transmit the scheduled PUSCH via a predetermined or default spatial relation. If the PUSCH is scheduled by the second TRP, the PUSCH may not be scheduled by a DCI format, wherein the UE may need to transmit the scheduled PUSCH via a predetermined or default spatial relation derived from one or more PUCCH resources configured within the active UL BWP or the active BWP. If the PUSCH is scheduled by the second TRP, the PUSCH may not be scheduled by DCI format 0_0. If the PUSCH is scheduled by the second TRP, the PUSCH may be scheduled by a DCI format with a field indicating a spatial relation or transmission beam or transmission filter.

In one embodiment, if the PUSCH is scheduled by the second TRP, the PUSCH may be scheduled by a DCI format, wherein the UE may not need to transmit the scheduled PUSCH via a predetermined or default spatial relation. If the PUSCH is scheduled by the second TRP, the PUSCH may be scheduled by a DCI format, wherein the UE may not need to transmit the scheduled PUSCH via a predetermined or default spatial relation derived from one or more PUCCH resources configured within the active UL BWP or the active BWP. If the PUSCH is scheduled by the second TRP, the PUSCH may be scheduled by DCI format 0_1. If the PUSCH is scheduled by the second TRP, the PUSCH may only be scheduled by a DCI format with a field indicating a spatial relation or transmission beam or transmission filter. If the PUSCH is scheduled by the second TRP, the PUSCH may only be scheduled by DCI format 0_1.

In one embodiment, if the PUSCH is scheduled by the second TRP, the network or the second TRP may use DCI format 0_1 to indicate the PUSCH to the UE. If the PUSCH is scheduled by the second TRP, the network or the second TRP may only be allowed to use DCI format 0_1 to indicate the PUSCH to the UE. If the PUSCH is scheduled by the second TRP, the network or the second TRP may only be allowed to use a DCI format with a field indicating a spatial relation or transmission beam or transmission filter to indicate the PUSCH to the UE.

In one embodiment, if the PUSCH is scheduled by the second TRP, the network or the second TRP may not be allowed to use DCI format 0_0 to indicate the PUSCH to the UE. If the PUSCH is scheduled by the second TRP, the network or the second TRP may not be allowed to use a DCI format without a field indicating a spatial relation or transmission beam or transmission filter to indicate the PUSCH to the UE. If the PUSCH is scheduled by the second TRP, the network or the second TRP may prevent from using DCI format 0_0 to indicate the PUSCH to the UE. If the PUSCH is scheduled by the second TRP, the network or the second TRP may prevent from using a DCI format without a field indicating a spatial relation or transmission beam or transmission filter to indicate the PUSCH to the UE.

In one embodiment, "the PUSCH is scheduled by the second TRP" may mean or be referred to that the PUSCH is scheduled by a CORESET associated with the second TRP or second TRP identifier. "The PUSCH is scheduled by the second TRP" may mean or be referred to that the PUSCH is scheduled by a DCI or DCI format associated with the second TRP or the second TRP identifier.

VI. Embodiment 4

In one embodiment, each of one or more PUCCH resource configured to the UE may be associated with or related to a TRP or a network panel. In particular, each of one or more PUCCH resource configured to the UE may be associated with or related to a TRP identifier. Each of one or more PUCCH resource configured to the UE may also be associated with or identified by a PUCCH group ID.

In one embodiment, one or more parameters included in a PUCCH resource may be associated with or related to a TRP or a network panel. In particular, one or more parameters included in a PUCCH resource may be associated with or related to a TRP identifier. One or more parameters included in a PUCCH resource may also be associated with or related to by a PUCCH group ID.

For example, spatial relation included in a PUCCH resource may be associated with or related to a TRP or a network panel. In particular, spatial relation included in a PUCCH resource may be associated with or related to a PUCCH group ID. A TRP identifier may also be associated with or related to a PUCCH group ID. Furthermore, a TRP identifier may be a PUCCH group ID.

In one embodiment, spatial relation included in a PUCCH resource may be associated with or related to a TRP or a network panel, which may mean that the UE is able to transmit an UL transmission to the TRP or the network panel via the spatial relation. The UE could be configured or provided with a first group of PUCCH resource(s). The UE could be configured or provided with a first PUCCH configuration within the active UL BWP or the active BWP. The first group of PUCCH resource(s) or the first PUCCH configuration may be associated with or related to the first TRP or the first network panel. In particular, the first group of PUCCH resource(s) or the first PUCCH configuration may be associated with or related to the first value of the TRP identifier. The first group of PUCCH resource(s) may be identified by a first PUCCH group ID.

In one embodiment, each PUCCH resource in the first group of PUCCH resource(s) or the first PUCCH configuration could be associated with or related to the first TRP or the first network panel. In particular, each PUCCH resource in the first group of PUCCH resource(s) or the first PUCCH configuration could be associated with or related to the first value of the TRP identifier. Each PUCCH resource in the first group of PUCCH resource(s) or the first PUCCH configuration could also be associated with or related to the first PUCCH group ID. The first group of PUCCH resource(s) or each PUCCH resource in the first group could be indicated or configured with the first PUCCH group ID. The first group of PUCCH resource(s) could be indicated or identified by RRC signaling, or MAC-CE, or DCI signaling.

In one embodiment, the UE could be configured or provided with a second group of PUCCH resource(s). Also, the UE could be configured or provided with a second PUCCH configuration within the active UL BWP or the active BWP. The second group of PUCCH resource(s) or the second PUCCH configuration may be associated with or related to the second TRP or the second network panel. In particular, the second group of PUCCH resource(s) or the second PUCCH configuration may be associated with or related to the second value of the TRP identifier. The second group of PUCCH resource(s) may be identified by a second PUCCH group ID.

In one embodiment, each PUCCH resource in the second group of PUCCH resource(s) or the second PUCCH configuration could be associated with or related to the second TRP or the second network panel. In particular, each PUCCH resource in the second group of PUCCH resource(s) or the second PUCCH configuration could be associated with or related to the second value of the TRP identifier. Also, each PUCCH resource in the second group of PUCCH resource(s) or the second PUCCH configuration could be associated with or related to the second PUCCH group ID. The second group of PUCCH resource(s) or each PUCCH resource in the second group could be configured with the second PUCCH group ID. The second group of PUCCH resource(s) could be indicated by RRC (Radio Resource Control) signaling, or MAC-CE, or DCI signaling.

In one embodiment, the first value of the TRP identifier may be associated with or related to the first PUCCH group ID; and the second value of the TRP identifier may be associated with or related to the second PUCCH group ID. Furthermore, the first value of the TRP identifier may be the first PUCCH group ID; and the second value of the TRP identifier may be the second PUCCH group ID. Moreover, the first group of PUCCH resource(s) could be configured with a first PUCCH group ID, and/or the second group of PUCCH resource(s) could be configured with a second PUCCH group ID. In addition, the first PUCCH group ID could be associated with or related to the first value of the TRP identifier, and/or the second PUCCH group ID could be associated with or related to the second value of the TRP identifier.

In one embodiment, the first group of PUCCH resource(s) and the second group of PUCCH resource(s) could be configured or provided in a same PUCCH configuration within the active UL BWP or the active BWP. Alternatively, the first group of PUCCH resource(s) and the second group of PUCCH resource(s) could be configured or indicated in different PUCCH configuration within the active UL BWP or the active BWP.

In one embodiment, the UE may be configured more than one PUCCH configuration within the active UL BWP or the active BWP. Alternatively, the UE may be configured only one PUCCH configuration within the active UL BWP or the active BWP.

In one embodiment, the default spatial relation may be selected or derived by a PUCCH resource. The default spatial relation may also be selected or derived by a PUCCH resource, wherein the PUCCH resource is indicated or configured with a spatial relation. Furthermore, the default spatial relation may be selected or derived by a PUCCH resource, wherein the PUCCH resource is configured within the active BWP or the active UL BWP.

In one embodiment, if or when the PUSCH is scheduled by the first TRP, the UE may transmit the PUSCH via the spatial relation of a first PUCCH resource. The PUSCH may be scheduled by a first CORESET. If or when the PUSCH is scheduled by the first CORESET, the UE may transmit the PUSCH via the spatial relation of a first PUCCH resource. The first CORESET may be a CORESET associated with the first TRP or the first value of the TRP identifier. If or when the PUSCH is scheduled by a DCI or DCI format associated with the first TRP or the first value of the TRP identifier, the UE may transmit the PUSCH via the spatial relation of a first PUCCH resource.

In one embodiment, if or when the PUSCH is associated with or related to the first TRP, the UE may transmit the PUSCH via the spatial relation of a first PUCCH resource. Furthermore, if or when the PUSCH is indicated or scheduled to be received by the first network panel, the UE may transmit the PUSCH via the spatial relation of a first PUCCH resource.

In one embodiment, if or when the PUSCH is scheduled by the second TRP, the UE may transmit the PUSCH via the spatial relation of a second PUCCH resource. The PUSCH may be scheduled by a second CORESET. If or when the PUSCH is scheduled by the second CORESET, the UE may transmit the PUSCH via the spatial relation of a second PUCCH resource. The second CORESET may be a CORESET associated with the second TRP or the second value of the TRP identifier. If or when the PUSCH is scheduled by a DCI or DCI format associated with the second TRP or the second value of the TRP identifier, the UE may transmit the PUSCH via the spatial relation of a second PUCCH resource.

In one embodiment, if or when the PUSCH is associated with or related to the second TRP, the UE may transmit the PUSCH via the spatial relation of a second PUCCH resource. Furthermore, if or when the PUSCH is indicated or scheduled to be received by the second network panel, the UE may transmit the PUSCH via the spatial relation of a second PUCCH resource.

In one embodiment, the default spatial relation could be the spatial relation of a first PUCCH resource. Additionally or alternatively, the default spatial relation could be the spatial relation of a second PUCCH resource.

In one embodiment, the first PUCCH resource could be a PUCCH resource comprising the lowest PUCCH resource ID among all PUCCH resources in the first group of PUCCH resource(s). Alternatively, the first PUCCH resource could be a PUCCH resource comprising the lowest PUCCH resource ID among all PUCCH resources in the first PUCCH configuration.

In one embodiment, the first PUCCH resource could be a PUCCH resource comprising the lowest PUCCH resource ID among all PUCCH resources with configured or indicated spatial relation in the first group of PUCCH resource(s). Alternatively, the first PUCCH resource is a PUCCH resource comprising the lowest PUCCH resource ID among all PUCCH resources with configured or indicated spatial relation in the first PUCCH configuration.

In one embodiment, the first PUCCH resource could be a PUCCH resource comprising the highest PUCCH resource ID among all PUCCH resources in the first group of PUCCH resource(s). Alternatively, the first PUCCH resource could be a PUCCH resource comprising the highest PUCCH resource ID among all PUCCH resources in the first PUCCH configuration.

In one embodiment, the first PUCCH resource could be a PUCCH resource comprising the highest PUCCH resource ID among all PUCCH resources with configured or indicated spatial relation in the first group of PUCCH resource(s). Alternatively, the first PUCCH resource could be a PUCCH resource comprising the highest PUCCH resource ID among all PUCCH resources with configured or indicated spatial relation in the first PUCCH configuration.

In one embodiment, the first PUCCH resource could be a PUCCH resource in the first group of PUCCH resource(s). Alternatively, the first PUCCH resource could be a PUCCH resource in the first PUCCH configuration.

In one embodiment, the second PUCCH resource could be a PUCCH resource comprising the lowest PUCCH resource ID among all PUCCH resources in the second group of PUCCH resource(s). Alternatively, the second PUCCH resource could be a PUCCH resource comprising the lowest PUCCH resource ID among all PUCCH resources in the second PUCCH configuration.

In one embodiment, the second PUCCH resource could be a PUCCH resource comprising the lowest PUCCH resource ID among all PUCCH resources with configured or indicated spatial relation in the second group of PUCCH resource(s). Alternatively, the second PUCCH resource could be a PUCCH resource comprising the lowest PUCCH resource ID among all PUCCH resources with configured or indicated spatial relation in the second PUCCH configuration.

In one embodiment, the second PUCCH resource could be a PUCCH resource comprising the highest PUCCH resource ID among all PUCCH resources in the second group of PUCCH resource(s). Alternatively, the second PUCCH resource could be a PUCCH resource comprising the highest PUCCH resource ID among all PUCCH resources in the second PUCCH configuration.

In one embodiment, the second PUCCH resource could be a PUCCH resource comprising the highest PUCCH resource ID among all PUCCH resources with configured or indicated spatial relation in the second group of PUCCH resource(s). Alternatively, the second PUCCH resource could be a PUCCH resource comprising the highest PUCCH resource ID among all PUCCH resources with configured or indicated spatial relation in the second PUCCH configuration.

In one embodiment, the second PUCCH resource could be a PUCCH resource in the second group of PUCCH resource(s). Alternatively, the second PUCCH resource could be a PUCCH resource in the second PUCCH configuration.

In one embodiment, the first group of PUCCH resource(s) could be grouped or identified by configured or indicated spatial relation. For example, one or more PUCCH resource(s) indicated or configured with a (same) first spatial relation could be grouped into the first group of PUCCH resource(s). The second group of PUCCH resource(s) could be grouped or identified by configured or indicated spatial relation. For example, one or more PUCCH resource(s) indicated or configured with a (same) second spatial relation could be grouped into the second group of PUCCH resource(s).

VII. Embodiment 5

In one embodiment, the default spatial relation may be selected or derived by a PUCCH resource. In particular, the default spatial relation may be selected or derived by a PUCCH resource, wherein the PUCCH resource is configured or indicated a spatial relation. Also, the default spatial relation may be selected or derived by a PUCCH resource, wherein the PUCCH resource is configured within the active BWP or the active UL BWP. The default spatial relation may be the first spatial relation. The default spatial relation may also be the second spatial relation.

In one embodiment, if the PUSCH is scheduled by the first TRP, the UE may transmit the PUSCH via the spatial relation of a first PUCCH resource or a first spatial relation. If the PUSCH is scheduled by a CORESET associated with the first TRP or the first TRP identifier, the UE may transmit the PUSCH via the first spatial relation. If the PUSCH is scheduled by a DCI or DCI format associated with the first TRP or the first TRP identifier, the UE may transmit the PUSCH via the first spatial relation. If the PUSCH is associated with or related to the first TRP, the UE may transmit the PUSCH via the spatial relation of a first PUCCH resource or a first spatial relation. If the PUSCH is indicated or scheduled to be received by the first network panel, the UE may transmit the PUSCH via the spatial relation of a first PUCCH resource or a first spatial relation.

In one embodiment, if the PUSCH is scheduled by the second TRP, the UE may transmit the PUSCH via the spatial relation of a second PUCCH resource or a second spatial relation. If the PUSCH is scheduled by a CORESET associated with the second TRP or the second TRP identifier, the UE may transmit the PUSCH via the second spatial relation. If the PUSCH is scheduled by a DCI or DCI format associated with the second TRP or the second TRP identifier, the UE may transmit the PUSCH via the second spatial relation.

In one embodiment, if the PUSCH is associated with or related to the second TRP, the UE may transmit the PUSCH via the spatial relation of a second PUCCH resource or a second spatial relation. If the PUSCH is indicated or scheduled to be received by the second network panel, the UE may transmit the PUSCH via the spatial relation of a second PUCCH resource or a second spatial relation.

In one embodiment, the default spatial relation could be the spatial relation of a first PUCCH resource. The default spatial relation could be the first spatial relation. Alternatively, the default spatial relation could be the spatial relation of a second PUCCH resource. The default spatial relation could be the second spatial relation.

In one embodiment, the first PUCCH resource could be configured or indicated by a signal. The first spatial relation could be configured or indicated by a signal. The first PUCCH resource and/or the first spatial relation could be associated with or related to the first TRP, or the first network panel, or the first TRP identifier. The UE could be able to transmit an UL transmission to the first TRP or the first network panel (successfully) via the first spatial relation or the spatial relation of the first PUCCH resource. The second PUCCH resource could be configured or indicated by a signal.

In one embodiment, the second spatial relation could be configured or indicated by a signal. The second PUCCH resource and/or the second spatial relation could be associated with or related to the second TRP, or the second network panel, or the second TRP identifier. The UE may be able to transmit an UL transmission to the second TRP or the second network panel (successfully) via the second spatial relation or the spatial relation of the second PUCCH resource.

In one embodiment, the signal may be a DCI, a MAC-CE, or a RRC configuration or a RRC parameter. The signal may indicate or configure more than one PUCCH resource, e.g. the first PUCCH resource and the second PUCCH resource. The signal may also indicate or configure more than one PUCCH resource for transmitting an UL transmission, e.g. the first PUCCH resource and the second PUCCH resource. Furthermore, the signal may indicate or configure more than one spatial relation, e.g. the first spatial relation and the second spatial relation. In addition, the signal may indicate or configure more than one spatial relation for transmitting an UL transmission, e.g. the first spatial relation and the second spatial relation.

Throughout the invention or one or more embodiments mentioned above, "spatial relation" can be referred to or be replaced with "beam", "transmitting beam", "UL beam", "transmission filter", "spatial parameter", "transmission precoder". Furthermore, throughout the invention or one or more embodiments mentioned above, concept of "a UE is able to transmit an UL transmission to a TRP or a network panel via a spatial relation" may mean that a transmission beam formed based on the spatial relation may match or point to a receiving beam of the TRP or the network panel. Additionally, the network is able to decode successfully the UL transmission transmitted by the spatial relation.

It is noted that all or some or any of above embodiments can be formed to a new embodiment.

Figure 6:
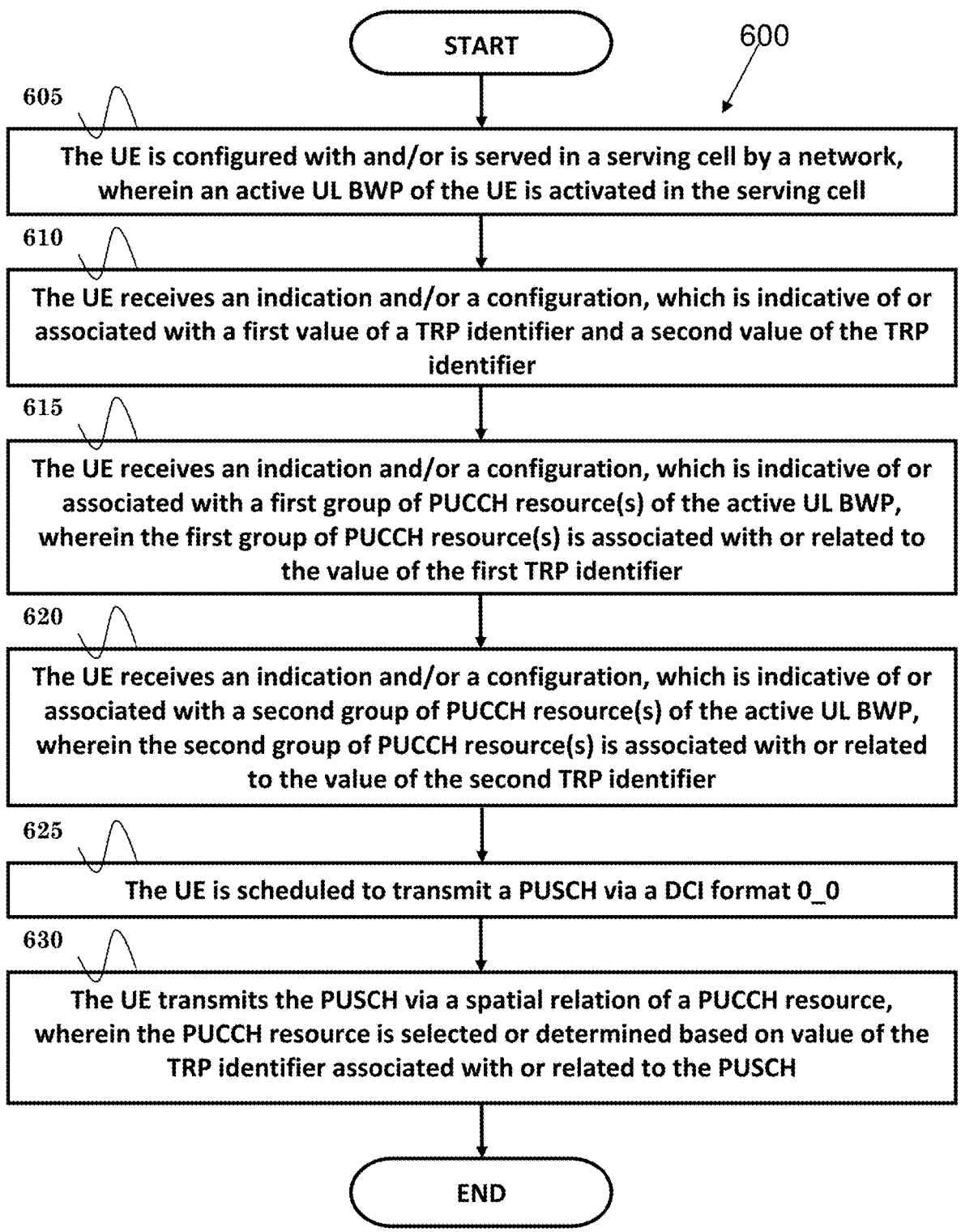
FIG. 6 is a flow chart according to one exemplary embodiment.

FIG. 6 is a flow chart 600 according to one exemplary embodiment from the perspective of a UE in a wireless communication system. In step 605, the UE is configured with and/or is served in a serving cell by a network, wherein an active UL BWP of the UE is activated in the serving cell. In step 610, the UE receives an indication and/or a configuration, which is indicative of or associated with a first value of a TRP identifier and a second value of the TRP identifier. In step 615, the UE receives an indication and/or a configuration, which is indicative of or associated with a first group of PUCCH resource(s) of the active UL BWP, wherein the first group of PUCCH resource(s) is associated with or related to the first value of the TRP identifier. In step 620, the UE receives an indication and/or a configuration, which is indicative of or associated with a second group of PUCCH resource(s) of the active UL BWP, wherein the second group of PUCCH resource(s) is associated with or related to the second value of the TRP identifier. In step 625, the UE is scheduled to transmit a PUSCH via a DCI format 0_0. In step 630, the UE transmits the PUSCH via a spatial relation of a PUCCH resource, wherein the PUCCH resource is selected or determined based on value of the TRP identifier associated with or related to the PUSCH.

In one embodiment, the PUCCH resource could be selected or determined from the first group of PUCCH resource(s) if or when the PUSCH is associated with or related to the first value of the TRP identifier, and/or the PUCCH resource could be selected or determined from the second group of PUCCH resource(s) if or when the PUSCH is associated with or related to the second value of the TRP identifier.

In one embodiment, the first value of the TRP identifier could be associated with or related to an index of a first CORESET, and/or the second value of the TRP identifier could be associated with or related to an index of a second CORESET. The first value of the TRP identifier could be associated with a first TRP serving or scheduling the UE, and/or the second value of the TRP identifier could be associated with a second TRP serving or scheduling the UE.

In one embodiment, the first group of PUCCH resource(s) and/or the second group of PUCCH resource(s) could be grouped or identified by configured or indicated spatial relation. For example, one or more PUCCH resource(s) indicated or configured with a (same) first spatial relation could be grouped into the first group of PUCCH resource(s). For example, one or more PUCCH resource(s) indicated or configured with a (same) second spatial relation could be grouped into the second group of PUCCH resource(s). Furthermore, the first group of PUCCH resource(s) could be associated with or identified by a first PUCCH group ID, and/or the second group of PUCCH resource(s) could be associated with or identified by a second PUCCH group ID. Moreover, the first group of PUCCH resource(s) could be configured with a first PUCCH group ID, and/or the second group of PUCCH resource(s) could be configured with a second PUCCH group ID. In addition, the first PUCCH group ID could be associated with or related to the first value of the TRP identifier, and/or the second PUCCH group ID could be associated with or related to the second value of the TRP identifier.

In one embodiment, the first group of PUCCH resource(s) and the second group of PUCCH resource(s) could be configured by the same PUCCH configuration of the active UL BWP. The PUCCH resource may comprise the lowest or the highest PUCCH resource ID among the first group of PUCCH resource(s). Additionally or alternatively, the PUCCH resource may comprise the lowest or the highest PUCCH resource ID among the second group of PUCCH resource(s).

Referring back to FIGS. 3 and 4, in one exemplary embodiment of a UE in a wireless communication system, wherein the UE is configured with and/or is served in a serving cell by a network and an active UL BWP of the UE is activated in the serving cell. The UE 300 includes a program code 312 stored in the memory 310. The CPU 308 could execute program code 312 to enable the UE (i) to receive an indication and/or a configuration, which is indicative of or associated with a first value of a TRP identifier and a second value of the TRP identifier, (ii) to receive an indication and/or a configuration, which is indicative of or associated with a first group of PUCCH resources of the active UL BWP, wherein the first group of PUCCH resource(s) is associated with or related to the first value of the TRP identifier, (iii) to receive an indication and/or a configuration, which is indicative of or associated with a second group of PUCCH resources of the active UL BWP, wherein the second group of PUCCH resource(s) is associated with or related to the second value of the TRP identifier, (iv) to be scheduled to transmit a PUSCH via a DCI format 0_0, and (v) to transmit the PUSCH via a spatial relation of a PUCCH resource, wherein the PUCCH resource is selected or determined based on value of the TRP identifier associated with or related to the PUSCH. Furthermore, the CPU 308 can execute the program code 312 to perform all of the above-described actions and steps or others described herein.

Figure 7:
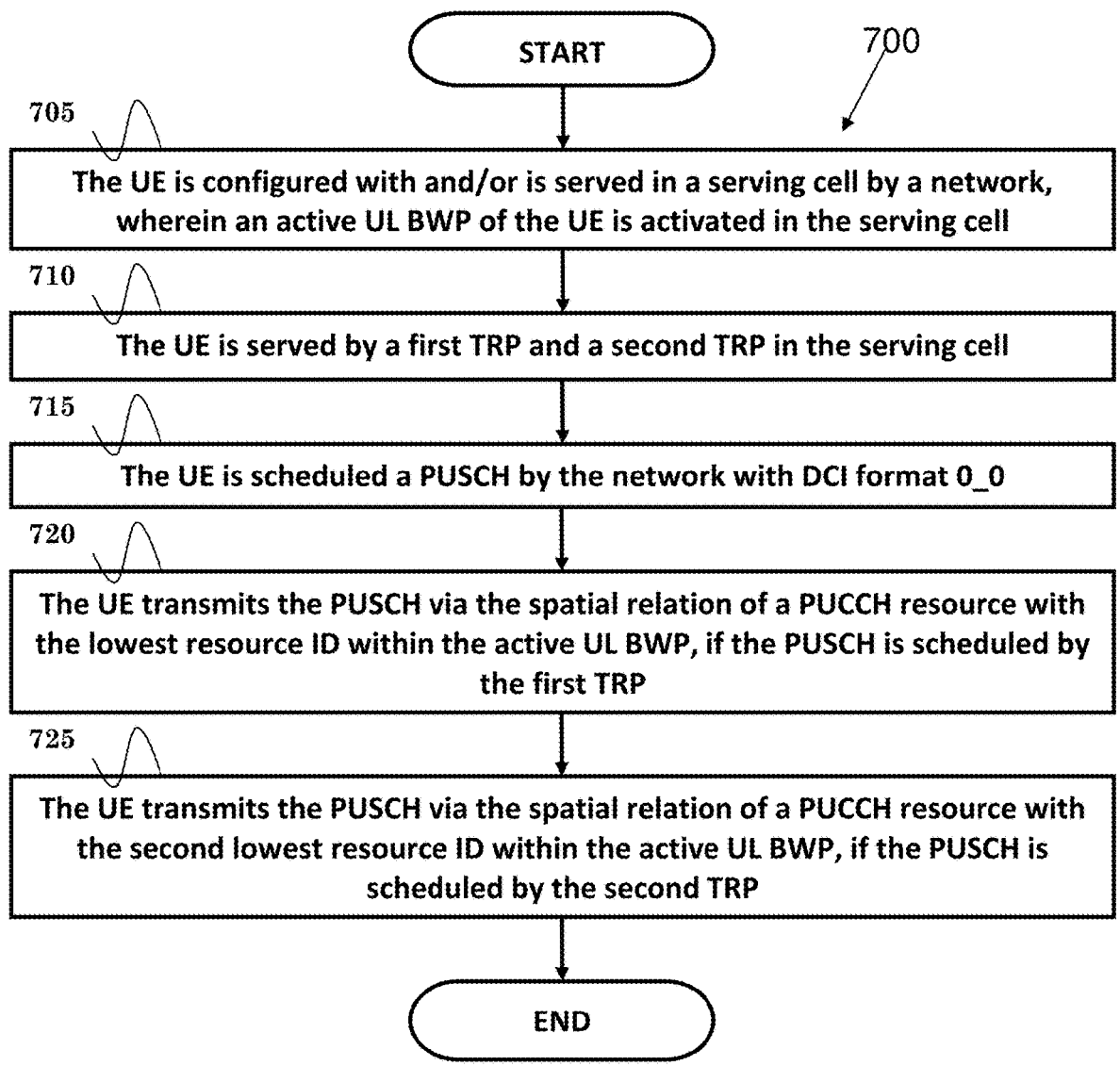
FIG. 7 is a flow chart according to one exemplary embodiment.

FIG. 7 is a flow chart 700 according to one exemplary embodiment from the perspective of a UE in a wireless communication system. In step 705, the UE is configured with and/or is served in a serving cell by a network, wherein an active UL BWP of the UE is activated in the serving cell. In step 710, the UE is served by a first TRP and a second TRP in the serving cell. In step 715, the UE is scheduled a PUSCH by the network with DCI format 0_0. In step 720, the UE transmits the PUSCH via the spatial relation of a PUCCH resource with the lowest resource ID within the active UL BWP, if the PUSCH is scheduled by the first TRP. In step 725, the UE transmits the PUSCH via the spatial relation of a PUCCH resource with the second lowest resource ID within the active UL BWP, if the PUSCH is scheduled by the second TRP.

In one embodiment, the PUCCH resource with the lowest resource ID could be associated with or related to the first TRP. The PUCCH resource with the lowest resource ID may comprise a spatial relation, wherein the spatial relation is associated with or related to the first TRP. Furthermore, the PUCCH resource with the lowest resource ID may comprise a spatial relation, wherein the UE is able to transmit UL transmission to the first TRP via the spatial relation.

In one embodiment, the PUCCH resource with the second lowest resource ID could be associated with or related to the second TRP. The PUCCH resource with the second lowest resource ID may comprise a spatial relation, wherein the UE is able to transmit UL transmission to the second TRP via the spatial relation.

Referring back to FIGS. 3 and 4, in one exemplary embodiment of a UE in a wireless communication system, wherein the UE is configured with and/or is served in a serving cell by a network, and an active UL BWP of the UE is activated in the serving cell. The first device 300 includes a program code 312 stored in the memory 310. The CPU 308 could execute program code 312 to enable the UE (i) to be served by a first TRP and a second TRP in the serving cell, (ii) to be scheduled a PUSCH by the network with DCI format 0_0, (iii) to transmit the PUSCH via the spatial relation of a PUCCH resource with the lowest resource ID within the active UL BWP, if the PUSCH is scheduled by the first TRP, and (iv) to transmits the PUSCH via the spatial relation of a PUCCH resource with the second lowest resource ID within the active UL BWP, if the PUSCH is scheduled by the second TRP. Furthermore, the CPU 308 can execute the program code 312 to perform all of the above-described actions and steps or others described herein.

Figure 8:
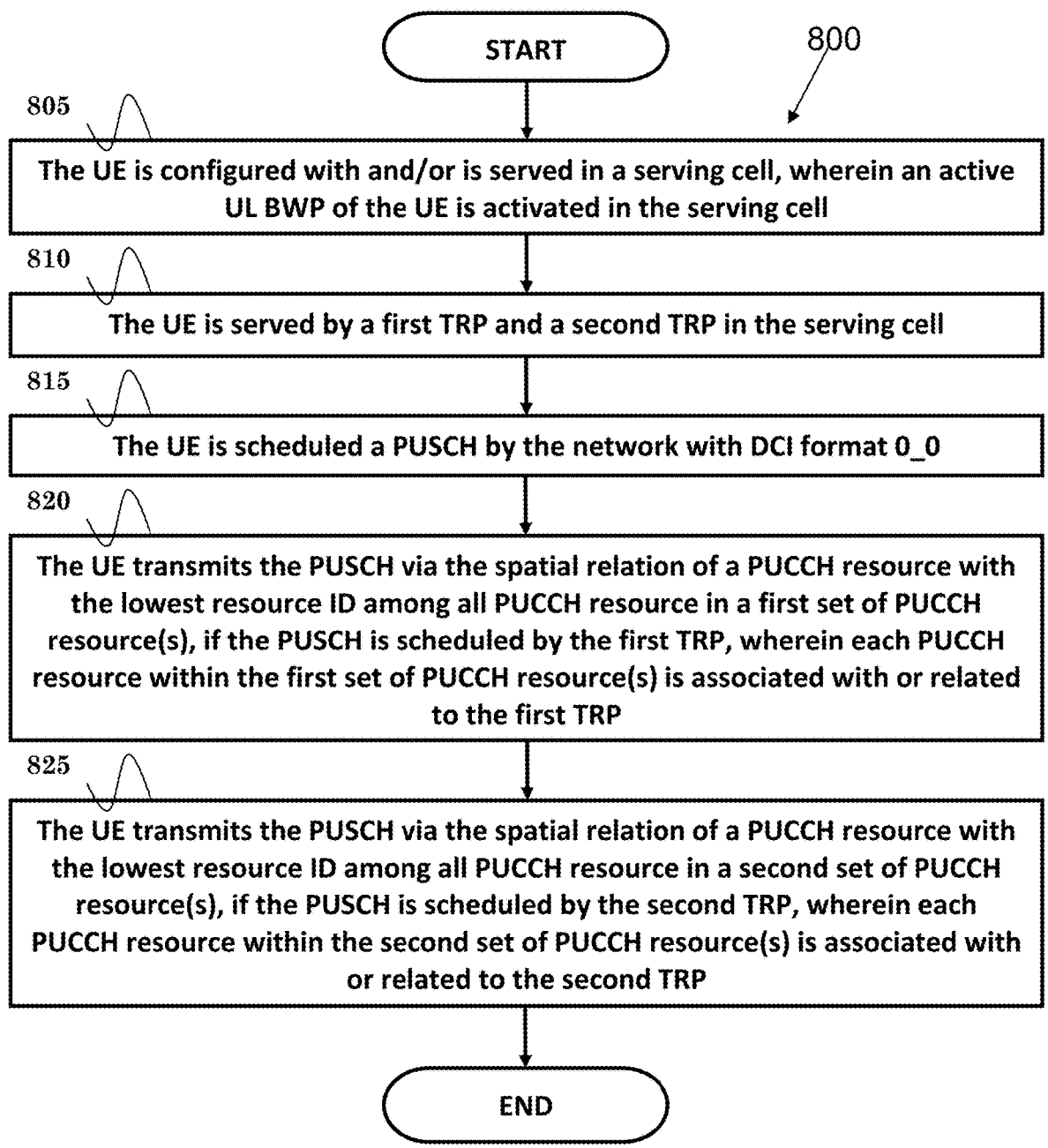
FIG. 8 is a flow chart according to one exemplary embodiment.

FIG. 8 is a flow chart 800 according to one exemplary embodiment from the perspective of a UE in a wireless communication system. In step 805, the UE is configured with and/or is served in a serving cell, wherein an active UL BWP of the UE is activated in the serving cell. In step 810, the UE is served by a first TRP and a second TRP in the serving cell. In step 815, the UE is scheduled a PUSCH by the network with DCI format 0_0. In step 820, the UE transmits the PUSCH via the spatial relation of a PUCCH resource with the lowest resource ID among all PUCCH resource in a first set of PUCCH resource(s), if the PUSCH is scheduled by the first TRP, wherein each PUCCH resource within the first set of PUCCH resource(s) is associated with or related to the first TRP. In step 825, the UE transmits the PUSCH via the spatial relation of a PUCCH resource with the lowest resource ID among all PUCCH resource in a second set of PUCCH resource(s), if the PUSCH is scheduled by the second TRP, wherein each PUCCH resource within the second set of PUCCH resource(s) is associated with or related to the second TRP.

In one embodiment, the first set of PUCCH resource(s) may comprise one or more PUCCH resources, which are configured to the UE within the active UL BWP, and associated with or related to the first TRP. Each PUCCH resource within the first set of PUCCH resource(s) could be associated with or related to the first TRP.

In one embodiment, the second set of PUCCH resource(s) may comprise one or more PUCCH resources, which are configured to the UE within the active UL BWP, and associated with or related to the second TRP. Each PUCCH resource within the second set of PUCCH resource(s) could be associated with or related to the second TRP.

In one embodiment, the first set of PUCCH resource(s) and the second PUCCH resource(s) could be configured by the same PUCCH configuration within the active (UL) BWP. There may be only one PUCCH configuration configured within the active UL BWP.

Referring back to FIGS. 3 and 4, in one exemplary embodiment of a UE in a wireless communication system, wherein the UE is configured with and/or is served in a serving cell by a network, and an active UL BWP of the UE is activated in the serving cell. The UE 300 includes a program code 312 stored in the memory 310. The CPU 308 could execute program code 312 to enable the UE (i) to be served by a first TRP and a second TRP in the serving cell, (ii) to be scheduled a PUSCH by the network with DCI format 0_0, (iii) to transmit the PUSCH via the spatial relation of a PUCCH resource with the lowest resource ID within the active UL BWP, if the PUSCH is scheduled by the first TRP, and (iv) to transmit the PUSCH via the spatial relation of a PUCCH resource with the second lowest resource ID within the active UL BWP, if the PUSCH is scheduled by the second TRP. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:
1. A method for a UE (User Equipment), in a wireless communication system, comprising:
   the UE is configured with and/or is served in a serving cell by a network, wherein an active UL (Uplink) BWP (Bandwidth Part) of the UE is activated in the serving cell;
   the UE receives an indication and/or a configuration, which is indicative of or associated with a first value of a TRP (Transmission/Reception Point) identifier and a second value of the TRP identifier;
   the UE receives an indication and/or a configuration, which is indicative of or associated with a first group of PUCCH (Physical Uplink Control Channel) resource(s) of the active UL BWP, wherein the first group of PUCCH resource(s) is associated with or related to the first value of the TRP identifier;
   the UE receives an indication and/or a configuration, which is indicative of or associated with a second group of PUCCH resource(s) of the active UL BWP, wherein the second group of PUCCH resource(s) is associated with or related to the second value of the TRP identifier;
   the UE is scheduled to transmit a PUSCH (Physical Uplink Shared Channel) via a DCI (Downlink Control Information) format 0_0; and
   the UE transmits the PUSCH via a spatial relation of a PUCCH resource, wherein the PUCCH resource is selected or determined based on value of the TRP identifier associated with or related to the PUSCH.

2. The method of claim 1, wherein the PUCCH resource is selected or determined from the first group of PUCCH resource(s) if or when the PUSCH is associated with or related to the first value of the TRP identifier, and/or the PUCCH resource is selected or determined from the second group of PUCCH resource(s) if or when the PUSCH is associated with or related to the second value of the TRP identifier.

3. The method of claim 1, wherein the first value of the TRP identifier is associated with or related to an index of a first CORESET (Control Resource Set), and/or the second value of the TRP identifier is associated with or related to an index of a second CORESET.

4. The method of claim 1, wherein the first value of the TRP identifier is associated with a first TRP serving or scheduling the UE, and/or the second value of the TRP identifier is associated with a second TRP serving or scheduling the UE.

5. The method of claim 1, wherein the first group of PUCCH resource(s), and/or the second group of PUCCH resource(s) are grouped or identified by configured or indicated spatial relation.

6. The method of claim 1, wherein the first group of PUCCH resource(s) are associated with or identified by a first PUCCH group ID, and/or the second group of PUCCH resource(s) are associated with or identified by a second PUCCH group ID.

7. The method of claim 1, wherein the first PUCCH group ID is associated with or related to the first value of the TRP identifier and/or the second PUCCH group ID is associated with or related to the second value of the TRP identifier.

8. The method of claim 1, wherein the first group of PUCCH resource(s) and the second group of PUCCH resource(s) are configured by the same PUCCH configuration of the active UL BWP.

9. The method of claim 1, wherein the PUCCH resource comprises the lowest or the highest PUCCH resource ID among the first group of PUCCH resource(s).

10. The method of claim 1, wherein the PUCCH resource comprises the lowest or the highest PUCCH resource ID among the second group of PUCCH resource(s).

11. A User Equipment (UE), wherein the UE is configured with and/or is served in a serving cell by a network and an active UL (Uplink) BWP (Bandwidth Part) of the UE is activated in the serving cell, comprising:
 a control circuit;
 a processor installed in the control circuit; and
 a memory installed in the control circuit and operatively coupled to the processor;
 wherein the processor is configured to execute a program code stored in the memory to:
  receive an indication and/or a configuration, which is indicative of or associated with a first value of a TRP (Transmission/Reception Point) identifier and a second value of the TRP identifier;
  receive an indication and/or a configuration, which is indicative of or associated with a first group of PUCCH (Physical Uplink Control Channel) resource(s) of the active UL BWP, wherein the first group of PUCCH resource(s) is associated with or related to the first value of the TRP identifier;
  receive an indication and/or a configuration, which is indicative of or associated with a second group of PUCCH resource(s) of the active UL BWP, wherein the second group of PUCCH resource(s) is associated with or related to the second value of the TRP identifier;
  be scheduled to transmit a PUSCH (Physical Uplink Shared Channel) via a DCI (Downlink Control Information) format 0_0; and
  transmit the PUSCH via a spatial relation of a PUCCH resource, wherein the PUCCH resource is selected or determined based on value of the TRP identifier associated with or related to the PUSCH.

12. The UE of claim 11, wherein the PUCCH resource is selected or determined from the first group of PUCCH resource(s), if or when the PUSCH is associated with or related to the first value of the TRP identifier, and/or the PUCCH resource is selected or determined from the second group of PUCCH resource(s), if or when the PUSCH is associated with or related to the second value of the TRP identifier.

13. The UE of claim 11, wherein the first value of the TRP identifier is associated with or related to an index of a first CORESET (Control Resource Set), and/or the second value of the TRP identifier is associated with or related to an index of a second CORESET.

14. The UE of claim 11, wherein the first value of the TRP identifier is associated with a first TRP serving or scheduling the UE, and/or the second value of the TRP identifier is associated with a second TRP serving or scheduling the UE.

15. The UE of claim 11, wherein the first group of PUCCH resource(s) and/or the second group of PUCCH resource(s) are grouped or identified by configured or indicated spatial relation.

16. The UE of claim 11, wherein the first group of PUCCH resource(s) are associated with or identified by a first PUCCH group ID, and/or the second group of PUCCH resource(s) are associated with or identified by a second PUCCH group ID.

17. The UE of claim 11, wherein the first PUCCH group ID is associated with or related to the first value of the TRP identifier and/or the second PUCCH group ID is associated with or related to the second value of the TRP identifier.

18. The UE of claim 11, wherein the first group of PUCCH resource(s) and the second group of PUCCH resource(s) are configured by the same PUCCH configuration of the active UL BWP.

19. The UE of claim 11, the PUCCH resource comprises the lowest or the highest PUCCH resource ID among the first group of PUCCH resource(s).

20. The UE of claim 11, the PUCCH resource comprises the lowest or the highest PUCCH resource ID among the second group of PUCCH resource(s).

* * * * *